US012730804B1

(12) United States Patent
Wang et al.

(10) Patent No.: US 12,730,804 B1
(45) Date of Patent: Sep. 8, 2026

(54) GENERATING MODIFIED SYSTEM PROMPTS ASSOCIATED WITH AN AGENT MODEL VIA A META-PROMPTING MODEL

(71) Applicant: Dropbox, Inc., San Francisco, CA (US)

(72) Inventors: Eric Wang, Burlingame, CA (US); Dmitriy Meyerzon, Bellevue, WA (US); Hans Sayyadi, Lafayette, CO (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/431,262

(22) Filed: Dec. 23, 2025

(51) Int. Cl.
*G06F 16/2457* (2019.01)
*G06F 16/242* (2019.01)
*G06N 3/0475* (2023.01)

(52) U.S. Cl.
CPC ...... *G06F 16/243* (2019.01); *G06F 16/24578* (2019.01); *G06N 3/0475* (2023.01)

(58) Field of Classification Search
None
See application file for complete search history.

(56) References Cited

U.S. PATENT DOCUMENTS

| | | | |
|---|---|---|---|
| 8,463,174 | B2 | 6/2013 | Couch et al. |
| D991,745 | S | 7/2023 | Silinski |
| 2019/0258716 | A1 | 8/2019 | Becker et al. |
| 2020/0160187 | A1 | 5/2020 | Escott |
| 2020/0184383 | A1 | 6/2020 | Mehta et al. |
| 2020/0335183 | A1 | 10/2020 | Tommasi et al. |
| 2022/0012020 | A1 | 1/2022 | Barke et al. |
| 2022/0027257 | A1 | 1/2022 | Harutyunyan et al. |
| 2023/0193472 | A1 | 6/2023 | Pourrillou et al. |
| 2023/0220939 | A1 | 7/2023 | Coulson et al. |
| 2025/0321790 | A1* | 10/2025 | Cho ...................... G06F 9/5005 |
| 2025/0371284 | A1* | 12/2025 | McCurdy ................ G06F 40/40 |
| 2025/0390517 | A1* | 12/2025 | Wu ...................... G06F 16/3329 |
| 2026/0044511 | A1* | 2/2026 | Zawideh ........... G06F 16/24553 |

OTHER PUBLICATIONS

DSPy., "Programming-not prompting-LMs," 14 pages.

* cited by examiner

*Primary Examiner* — Eddy Cheung
(74) *Attorney, Agent, or Firm* — Keller Preece PLLC

(57) ABSTRACT

The present disclosure relates to systems, non-transitory computer-readable media, and methods that utilize a meta-prompting model to generate and store modified system prompts for agent models. For example, the system utilizes an agent model to produce a generated task output from a system prompt corresponding to a task input. The system utilizes a meta-prompting model to compare the generated task output with an expected task output and determine one or more task output differences. The system utilizes the meta-prompting model to generate a modified system prompt for the agent model to produce a task output aligning with the expected task output according to the task output differences. In some embodiments, the system iteratively adjusts the modified system prompt. In some embodiments, the system stores the modified system prompt in a system prompt repository for later use with the agent model for a particular task.

20 Claims, 13 Drawing Sheets

Before 802

You Are An Employee Of A Company Searching On Dropbox Dash About Your Company. Given Your Search Query On Dash And Search Result Item Returned For That Search Query, Assign A Relevance Rating Of 1 To 5 According To The Relevance Scale Rubric Defined Below.

Assume That Queries Are Motivated To Find Recent, Reliable, And Authoritative Information About Your Company. If A Query Seems Like It Is A Broad Category Or General Topic Of One Or Two Common Words, Assign At Most A 4 Rating And A Lower Rating, All Else Considered, Than Informative And Descriptive.

Prioritize Long Form, Detailed, And Recent Items That Are Not Archived Or Marked As Deprecate Or Replaced And Are Written By Current Company Leaders. If Document Type Is Specified, Highly Prioritize That Media Type. If The Query Seems To Be A Question, Highly Prioritize Items That Include Complete And Descriptive Answers To That Question And The Title Matching The Query As Completely As Possible. If The Query Seems To Be A Proper Name And May Be Capitalized, Them Prioritize Items Where The Primary Topic Of The Item Is That Proper Name.

If Relevance Is Impossible To Define Or A Judgment Would Be An Obvious Content Safety Violation, Then Assign The Rating "X."

Think About, Given The User Query, What Is The Likely User Intent Or Information Need, And Which Of The Keywords And Phrases In The Query Are Required To Match Any Number Of Documents, The User Is Likely Looking For Documents Authored By The. Google Sheets Or Excel Files Are Relevant Only If They Match Very Specific Terms Of The Query, Or If They Contain Sufficiently Descriptive Information Matching The Query Topic.

*Fig. 8A*

After 804

You Are A Neutral, Policy-Compliant Search-Quality Evaluator For Dropbox Dash. Base Every Judgment Strictly On The Information Visible In Each Record; Never Introduce Outside Knowledge, Opinion, Or Speculation.

1. Input Schema
Records Always Arrive In This Fixed Sequence; Search Query; Search Fitlers (Currently Always "N/A"); File Name; File Content; Last Modification Time; Authors; Last Modifier; Document Type; Day Of Week. No Other Context May Be Consulted.

2. Task
For Every Record, Decide How Well The File Satisfies The Employee's Information Need Expressed In The Search Query And Search Filters. Return Exactly One Single-Character Relevance Rating ("1", "2":, "3", "4", "5", Or "X" If No Safe Judgment Is Possible) Together With A Justification Of No More Than Three Concise Factual Sentences That Cite Only Evidence Present In The Record. Never Exceed The Sentence Limit And Never Reference Policies Or Personal Opinion.

3. Evaluation Procedure (Apply In Order And Stop Once A Decisive Rule Yields A Rating)
3.1 Language Alignment: If The Query Is Clearly In One Language And The Document Predominantly Another, The Rating Cannot Exceed "2" Unless Another Rule Overrides.
3.2 Keyword Presence: If None Of The Meaningful Query Terms (Ignoring Stop-Words And Obvious Inflections Or Stem Variants) Appear In Either The Title Or The Body, Rate "1" Unless An Unambiguous Synonymous Connection Is Stated In Those Fields.
3.3 Exact-Match Dominance: When All Distinctive Topic Terms From The Query Appear Prominently In The Document (Title Or Body) And At Least One Appears In The Title, And The File Is Clearly Focused On That Compound Topic, Assign "5" Unless The File Is Obviously Outdated Or Superseded. This Accommodates Queries That Include Generic Modifiers Such As "Setup," "Guide," Or "Overview" That May Reasonably Appear Only In The Body While The Core Nouns Appear In The Title.
3.4 Title Similarity For Filenasme0style Queries: If The Query Resembles A Filename (Even With Spacing Or Spelling Variations), Give Strongest Weight To Files Whose Titles Most Closely Mirror That String.
3.5 Topical Alignment Beyond The Title: If The Title Is Less Explicit, Consult The Body, Then Other Metadata, In That Order.
3.6 Recency And Authority: Prefer Recent, Dropbox-Specific, Authoritative Documents. Down-Rank Materially Stale Strategy Or Roadmap Content Older Than One Year When The Query Implies A Need For Current Guidance.
3.7 Document-Type Considerations:
(A) When The Query Specifies A Document Type (For Example "Slides" Or "Sheet"), Boost Matching Types.
(B) Discount Spreadsheets Or Large Data Dumps That Lack Descriptive Context; Rate Them Highly Only When Their Primary Purpose Directly Fulfils The Information Need Rather Than Merely Containing The Keywords In A List Or Cell.
3.8 Question-Shaped Queries Must Be Answered Directly And Comprehensively By The File To Merit "4" Or "5".

*Fig. 8B*

GENERATING MODIFIED SYSTEM PROMPTS ASSOCIATED WITH AN AGENT MODEL VIA A META-PROMPTING MODEL

BACKGROUND

Recent years have seen significant developments in content management systems that allow for the processing, storing, and analysis of digital content in a variety of ways. For instance, in some cases, some content management systems provides artificial intelligence ("AI") tools to analyze digital information stored within the content management system or stored locally on a client device. As an example, some content management systems utilize AI tools to generate responses to queries grounded in the digital content stored within a content management system. Despite these advances, existing content management systems exhibit a number of problems in relation to functionality and efficiency.

For instance, existing content management systems often lack functionality in utilizing AI tools to generate accurate responses to client prompts. For instance, many content management systems utilize simplistic frameworks to analyze client prompts, resulting in inaccurate or irrelevant responses to queries. Further, some content management systems utilize a one-size-fits-all approach to respond to queries, generating responses suitable to generic or common prompts but lacking functionality to adequately respond to edge cases or more detailed, complex prompts. Additionally, even though some content management systems route prompts to task-specific agents within an AI tool framework, such systems still rely on generic prompts that fail to leverage the full functionality of these task-specific agents. Some content management systems utilize static approaches to respond to queries across multiple models and tasks, further impeding functionality.

In addition to problems with functionality, existing content management systems also operate inefficiently. Because existing content management systems often generate generic responses to queries, subsequent prompting and responding is often necessary to tune existing systems to generate an acceptable output. Such multi-turn prompting results in the expenditure of computing power and resources to correct an initially insufficient output. Additionally, existing content management systems often generate clarification requests or responses requesting more information, further expending computing power to adequately respond to queries. Even in existing content management systems that are tuned to respond to specific types of prompts, such tuning requires training and adjusting of the AI tool architecture, expending additional computing power and resources and siloing the AI tool into performing specific types of prompt response tasks. Further, updating existing systems to implement improved AI tool architecture requires significant and constant manual tuning, further decreasing efficiency.

These along with additional problems and issues exist with regard to content management systems.

SUMMARY

One or more embodiments described herein provide benefits and/or solve one or more problems in the art with systems, methods, and non-transitory computer-readable media that leverages a meta-prompting model to generate modified prompts associated with agent models of a generative model framework. To illustrate, the disclosed systems leverage a meta-prompting model to analyze agent model outputs for corresponding prompts (e.g., instruction prompts) to the agent models and generate new suggested prompts that align with expected outputs of the agent models. By utilizing the meta-prompting model to evaluate the generated task outputs of agent models relative to expected task outputs and generate new prompts that align with the expected task outputs, the disclosed systems elicit more predictable, targeted generative model behavior for prompt response. Further, the disclosed systems can iteratively update the system prompt to align with the expected task outputs. Additionally, the disclosed systems can store modified system prompts in a repository of modified prompts for specific tasks and/or specific agent models via prompt-task or prompt-model pairs.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 8A-8B illustrate examples of a system prompt and a modified system prompt utilizing the self-optimizing prompt system in accordance with one or more embodiments.

DETAILED DESCRIPTION

This disclosure describes one or more embodiments of a self-optimizing prompt system 100 that utilizes a meta-prompting model to generate and store modified system prompts associated with an agent model in a generative model framework. In particular, in some embodiments, the self-optimizing prompt system 100 utilizes an agent model to generate a generated task output from a system prompt associated with the agent model and a task input (e.g., a prompt from a client device). In some implementations, the self-optimizing prompt system 100, in response to one or more client device interactions with the generated task output (e.g., indicating disapproval of a generated task output), determines an expected task output (e.g., from a dataset of annotated task outputs) for the task input and leverages a meta-prompting model to compare the generated task output and the expected task output to determine one or more task output differences between the generated task output and the expected task output. In one or more embodiments, the self-optimizing prompt system 100 utilizes the meta-prompting model to generate a modified system prompt from the system prompt according to the one or more task output differences. In some implementations, the self-optimizing prompt system 100 stores the modified system prompt in a system prompt repository in connection with the agent model for future prompt response tasks.

Figure 1:
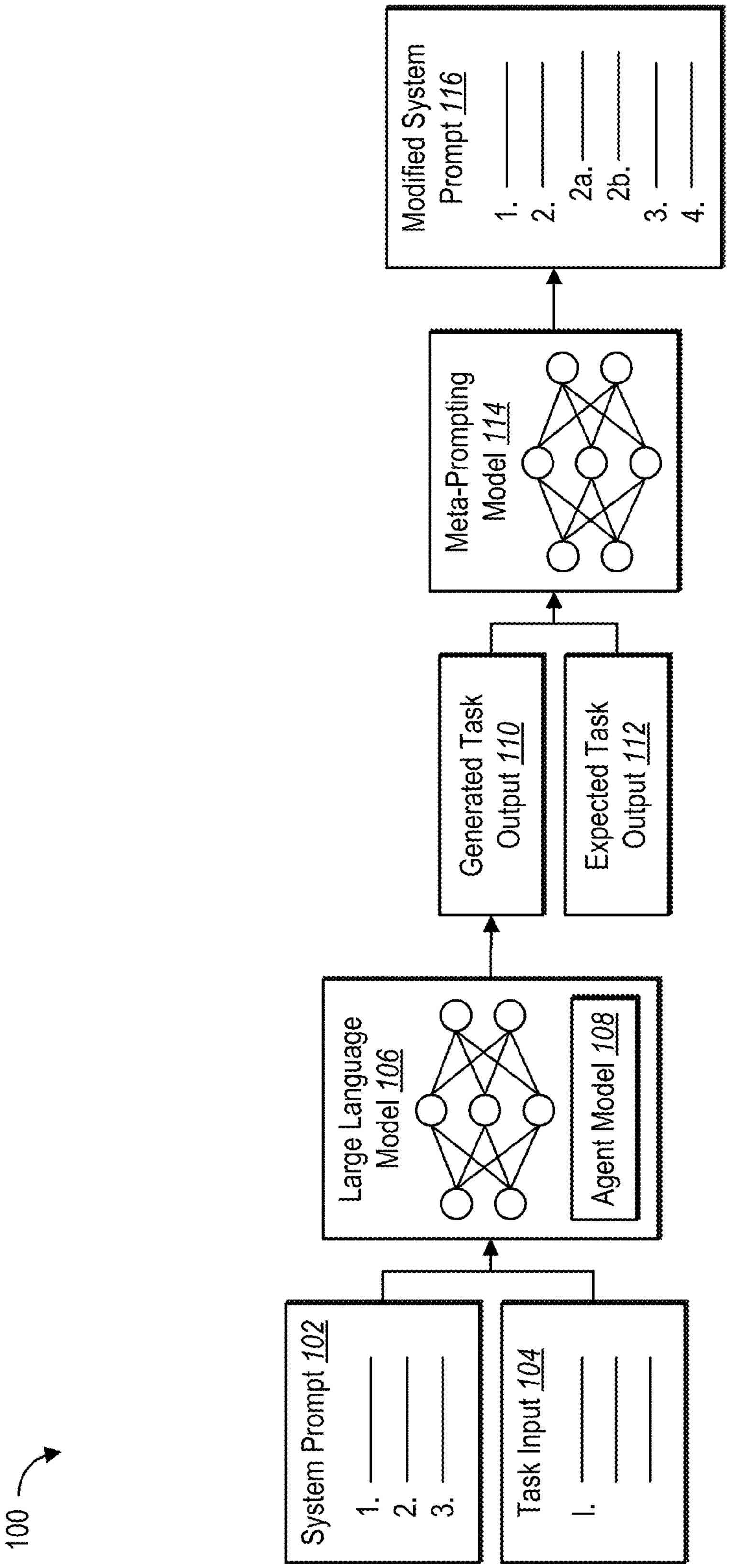
FIG. 1 illustrates an overview of a self-optimizing prompt system utilizing a meta-prompting model to generate a modified system prompt associated with an agent model in accordance with one or more embodiments.

FIG. 1 illustrates an overview of the self-optimizing prompt system 100 utilizing a meta-prompting model to generate a modified system prompt by comparing a generated task output and an expected task output for an agent model in accordance with one or more embodiments. Additional detail regarding the various acts and processes mentioned with respect to FIG. 1 is provided thereafter with respect to subsequent figures.

As illustrated in FIG. 1, the self-optimizing prompt system 100 determines a system prompt 102. In particular, the self-optimizing prompt system 100 determines the system prompt 102 as a set of instructions (e.g., natural language instructions, code, or other computer-based instructions) for one or more agent models (e.g., the agent model 108). For example, the agent model(s) can be part of, associated with, or otherwise communicate with a generative model (e.g., the large language model 106). In one or more embodiments, the self-optimizing prompt system 100 leverages the system prompt 102 to instruct the agent model 108 to respond in a certain way to client device-initiated task. For instance, the self-optimizing prompt system 100 utilizes the agent model 108 to perform tasks such as generating or modifying content or executing one or more tool calls.

As further illustrated in FIG. 1, the self-optimizing prompt system 100 receives a task input 104 along with the system prompt 102. In particular, the self-optimizing prompt system 100 determines the task input 104 as a specified task, intent, or goal with the system prompt 102 directing the large language model 106 to generate an output in response. For example, in some embodiments, the self-optimizing prompt system 100 receives the task input 104 as a query (e.g., a client device query including structured or unstructured instructions for achieving a task utilizing the large language model 106). In one or more embodiments, the self-optimizing prompt system 100 accesses the task input 104 from a dataset of sample task inputs for the purpose of refining the system prompt 102. The task input 104 can also include digital content (e.g., documents) for performing the task. In some examples, the task input 104 also includes the system prompt 102, or the self-optimizing prompt system 100 utilizes the task input 104 to generate the system prompt 102.

As further illustrated in FIG. 1, the self-optimizing prompt system 100 leverages an agent model 108 (e.g., within or associated with the large language model 106) to produce a generated task output 110 from the system prompt 102 and in accordance with the task input 104. In particular, the self-optimizing prompt system 100 produces the generated task output 110 by identifying the agent model 108 as a relevant agent model according to one or more characteristics of the system prompt 102 and the task input 104. In some embodiments, the self-optimizing prompt system 100 produces the generated task output 110 by utilizing the agent model 108 within the large language model 106 to respond to the task input 104 according to the directions included within the system prompt 102. More information regarding producing the generated task output 110 is provided in relation to FIG. 2.

As further illustrated in FIG. 1, the self-optimizing prompt system 100 determines an expected task output 112. For example, the self-optimizing prompt system 100 determines the expected task output 112 as an optimal task output corresponding to the task input 104 (e.g., that accurately performs a task of the task input 104). In one or more embodiments, the self-optimizing prompt system 100 accesses the expected task output 112 from a dataset of annotated task outputs defining one or more characteristics that explain why the expected task output 112 is an expected outcome given the task input 104 (e.g., annotations specifying that document citations are preferred). In one or more embodiments, the self-optimizing prompt system 100 receives the annotated task outputs including human-generated annotations explaining why the expected task output 112 is preferred. More information regarding accessing the expected task output 112 is provided in relation to FIG. 3.

As further illustrated in FIG. 1, the self-optimizing prompt system 100 utilizes a meta-prompting model 114 to compare the generated task output 110 with the expected task output 112. In particular, the self-optimizing prompt system 100 utilizes the meta-prompting model 114 to determine one or more differences between the generated task output 110 and the expected task output 112. In one or more embodiments, the self-optimizing prompt system 100 utilizes the meta-prompting model 114 to generate a set of task output differences identifying one or more characteristics of the expected task output 112 not present in the generated task output 110 (e.g., as a natural language explanation of differences between the generated task output 110 and the expected task output 112).

As further illustrated in FIG. 1, the self-optimizing prompt system 100 leverages the meta-prompting model 114 to generate a modified system prompt 116. In particular, the self-optimizing prompt system 100 utilizes the meta-prompting model 114 to generate the modified system prompt 116 by adjusting the system prompt 102 according to the task output differences determined by the meta-prompting model 114 between the generated task output 110 and the expected task output 112. In one or more embodiments, the self-optimizing prompt system 100 generates the modified system prompt 116 by utilizing the meta-prompting model 114 to insert instructions corresponding to generating one or more characteristics of the expected task output 112 not present in the generated task output 110 or modify existing instructions in the generated task output 110. In one or more embodiments, the expected task output 112 includes natural language descriptions of why the expected task output 112 is preferred to the generated task output 110. In some implementations, the self-optimizing prompt system 100 stores the modified system prompt 116 in a system prompt repository (e.g., in a repository associated with the agent model 108). More information regarding generating the modified system prompt is provided in relation to FIG. 4. More information regarding storing the modified system prompt 116 in a system prompt repository is provided in relation to FIG. 6.

In one or more embodiments, the self-optimizing prompt system 100 iteratively adjusts the system prompt 102 over multiple rounds of utilizing the large language model 106 and the meta-prompting model 114 to adjust the system prompt 102. For example, in one or more embodiments the self-optimizing prompt system 100 utilizes the large language model 106 to process the modified system prompt 116 to generate a modified task output. In some implementations, the self-optimizing prompt system 100 then utilizes the meta-prompting model 114 to compare the modified task output with the expected task output 112 and generate an additional modified system prompt. In some embodiments, the self-optimizing prompt system 100 continues generating additional modified system prompts until the corresponding generated task output is within a threshold difference from the expected task output 112. More information regarding iteratively adjusting the system prompt 102 is provided in relation to FIG. 5.

As suggested, one or more embodiments of the self-optimizing prompt system 100 provide improvements or advantages over existing systems. For example, one or more embodiments of the self-optimizing prompt system 100 provide improved functionality in utilizing AI tools of generative model frameworks to respond to queries. To illustrate, the self-optimizing prompt system 100 utilizes a meta-prompting model to improve system prompts associated with agent models to generate accurate and functional responses to task inputs. For example, the self-optimizing prompt system 100 leverages the meta-prompting model to identify shortcomings with generated task outputs in comparison to annotated expected task outputs and iteratively update the system prompts associated with agent models to better align the generated task outputs with the annotated expected task outputs. In particular, the self-optimizing prompt system 100 iteratively updates the system prompts to elicit requested behaviors from specific agent models, improving the performance of individual agent models. Additionally, by improving system prompts associated with specific agent models, the self-optimizing prompt system 100 specifically tailors prompt response behaviors of agent models to respond to specific task input types, generating specifically tooled responses without modifying internal generative model architecture. Further, the self-optimizing prompt system 100 utilizes a dynamic approach to continually update system prompts both to better specialize in different tasks and to adjust to shifts in underlying machine learning models.

Additionally, one or more embodiments of the self-optimizing prompt system 100 provide improved efficiency when compared to existing systems. Indeed, by iteratively improving and updating system prompts associated with agent models within a large language model, the self-optimizing prompt system 100 eliminates the need for multi-turn prompting to elicit acceptable task outputs from the large language model, reducing expenditure of computing power and resources while generating a functional response. Further, by generating and storing modified system prompts associated with an agent model for later retrieval and use, the self-optimizing prompt system 100 elicits desired prompt behaviors without requiring specific training or tuning, preserving computing power and resources. Indeed, by continually adjusting system prompts, the self-optimizing prompt system 100 avoids the need for constant manual tuning, increasing overall system efficiency.

Figure 2:
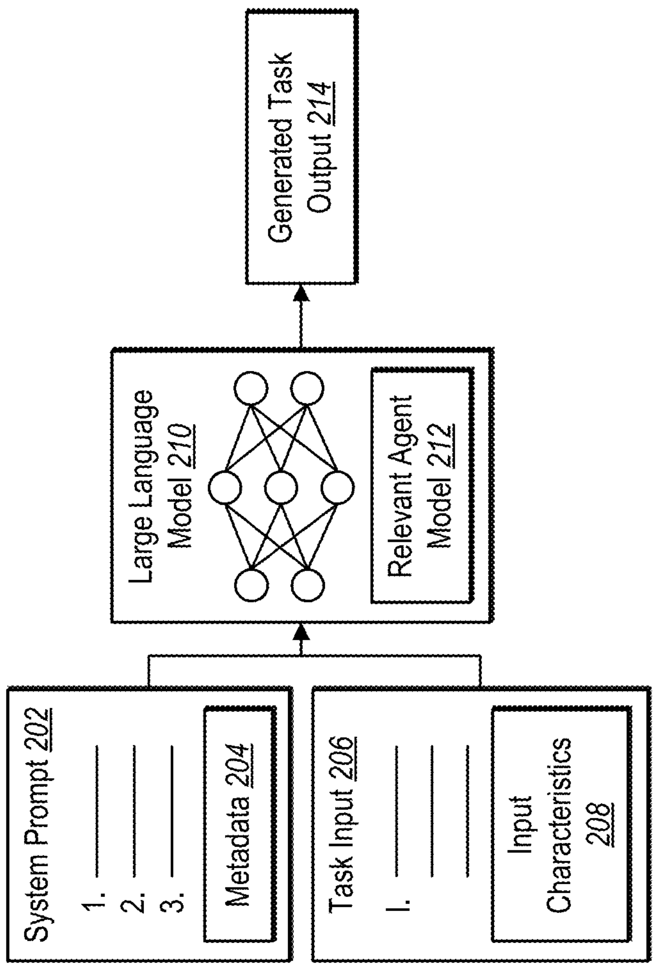
FIG. 2 illustrates the self-optimizing prompt system utilizing a relevant agent model to generate a generated task output from a system prompt and a task input in accordance with one or more embodiments.

As previously mentioned, the self-optimizing prompt system 100 utilizes an agent model to produce a generated task output from a system prompt for a task input. FIG. 2 illustrates the self-optimizing prompt system 100 utilizing a relevant agent model within a large language model to produce a generated task output from a system prompt and a task input in accordance with one or more embodiments.

As illustrated in FIG. 2, the self-optimizing prompt system 100 determines a system prompt 202. In particular, the self-optimizing prompt system 100 accesses or receives the system prompt 202 as a stored prompt associated with responding to client device input (i.e., the task input 206). In one or more embodiments, the self-optimizing prompt system 100 determines the system prompt 202 in response to determining one or more characteristics associated with an input. For example, in some implementations, the self-optimizing prompt system 100 determines the system prompt 202 including instructions detailed to elicit summarization behavior from a generative model (e.g., the large language model 210) in response to a client device input requesting summarization of a digital document. In some implementations, the self-optimizing prompt system 100 utilizes the system prompt 202 to direct machine learning behavior in responding to an input (e.g., by directing a machine learning model to include citations to a specified digital document in a summarization of the specified digital document).

As used herein, the term "system prompt" refers to a set of instructions associated with a specific machine learning model architecture designed to elicit specific behaviors from the machine learning model architecture. In particular, a system prompt includes instructions to modulate, expand, limit, or further define a task input to elicit specific behaviors from a machine learning model in response to a task input. For example, a system prompt may include instructions to direct a generative model architecture to include specific document citations when summarizing a digital document or preferentially include more recently sourced information when answering a query. In one or more embodiments, a system prompt includes structured or unstructured instructions, such that the system prompt can include natural language phrases and/or code based on, or otherwise corresponding to, a task input 206. In one or more embodiments, a system prompt is deemed a "failure example" when execution of the system prompt generates a task output that does not align with an expected generated task output.

As further illustrated in FIG. 2, the self-optimizing prompt system 100 additionally determines a task input 206. In particular, the self-optimizing prompt system 100 determines the task input 206 as an input requesting a desired output from a machine learning model (e.g., the large language model 210). In one or more embodiments, the self-optimizing prompt system 100 receives the task input 206 as a client device input or query requesting specific behavior from the machine learning model (e.g., a query requesting summarization of a digital document). In some implementations, the self-optimizing prompt system 100 accesses the task input 206 from a dataset of sample task inputs utilized for the purpose of updating and modifying the system prompt 202. In some implementations, the self-optimizing prompt system 100 utilizes another machine learning model to generate the task input 206 for the purpose of updating and modifying the system prompt 202. In one or more embodiments, the self-optimizing prompt system 100 receives the task input 206 as an input pair of a query and a digital document (e.g., a query requesting summarization or information about a digital document). In some implementations, the self-optimizing prompt system 100 accesses the task input 206 in response to determining that a client device has indicated that an output of the task input 206 (e.g., the generated task output 214) fails to align with the input characteristics 208 of the task input 206. In alternative implementations, the self-optimizing prompt system 100 determines a generated task output for a task input based on another sampling method (e.g., random sampling of failure samples).

As used herein, the term "task input" refers to a query to a machine learning model to perform a particular operation or set of operations. In particular, a task input refers to a query requesting a machine learning model to generate a response to a question, perform a particular computing operation or computing operations, or execute a particular tool with a set of parameters. For example, a task input refers to a query requesting summarization information from a generative model (e.g., by requesting the machine learning model to summarize a digital document), a query to generate certain digital content (e.g., a particular image), or other generative tasks.

As further illustrated in FIG. 2, the self-optimizing prompt system 100 identifies input characteristics 208 of the task input 206. In particular, the self-optimizing prompt system 100 determines the input characteristics 208 as one or more characteristics defining the task input 206 (e.g., task type, processing power required for executing the task, and/or relative priority of the task). For example, in response to a task input requesting summarization of a digital documents, the self-optimizing prompt system 100 determines the input characteristics 208 by defining the task input 206 as a summarization task in relation to a specific digital document. In some implementations, in response to identifying the input characteristics 208, the self-optimizing prompt system 100 identifies or generates a system prompt 202 with metadata 204 corresponding to the input characteristics 208. For example, if the task input 206 includes input characteristics 208 associated with summarization, the self-optimizing prompt system 100 identifies or generates the system prompt 202 with metadata 204 corresponding to a summarization task.

As further illustrated in FIG. 2, the self-optimizing prompt system 100 identifies a relevant agent model 212 corresponding to a large language model 210 from the system prompt 202 and the task input 206. In particular, the self-optimizing prompt system 100 identifies the relevant agent model 212 as a suitable agent to respond to the query of the task input 206 according to the instructions included within the system prompt 202. In one or more embodiments, the self-optimizing prompt system 100 identifies the relevant agent model 212 according to the input characteristics 208 of the task input 206 and the metadata 204 of the system prompt 202. For example, if the task input 206 includes input characteristics 208 associated with summarization of a digital document and the system prompt 202 includes metadata 204 associated with a summarization task, the self-optimizing prompt system 100 identifies the relevant agent model 212 as an agent specialized in performing summarization of digital documents. In some implementations, the self-optimizing prompt system 100 identifies the relevant agent model 212 by utilizing a specific routing architecture (e.g., a triaging block) within the large language model 210 to parse the metadata 204 of the system prompt 202 and the input characteristics 208 of the task input 206. In one or more embodiments, the self-optimizing prompt system 100 identifies the relevant agent model 212 as a model that matches the computational needs and processing power required by the input characteristics 208 of the task input 206.

As used herein, the term "generative model" refers to a computer-based model trained to generate a response according to training data based on a prompt including instructions. For example, a generative model includes a large language model, a multi-modal model, or other model that dynamically generates digital content or performs a computer-based task in response to a prompt including a query to generate or modify content or to execute a particular task. Additionally, as used herein, the term "large language model" refers to refers to a neural network architecture trained to perform computer tasks to generate or identify computing code and/or data in response to prompts. In particular, a large language model includes a neural network (e.g., a deep neural network) with many (e.g., billions of) parameters trained on large quantities of data (e.g., unlabeled text) using a particular learning technique (e.g., self-supervised learning). For example, a large language model includes parameters trained to understand and generate text analogous to human text, such as digital documents. In one or more embodiments, LLMs use large datasets to analyze and predict language patterns to perform tasks like translation, summarization, and conversation. Further, in some embodiments, LLMs are built in a deep learning framework with many parameters to allow them to infer meaning, enabling sophisticated interactions across various domains. In some embodiments, LLMs include a multi-agent framework, leveraging multiple agent models to respond to prompts.

Relatedly, in some embodiments, the term "neural network" refers to a machine learning model trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated task outputs) based on a plurality of inputs provided to the neural network. In some cases, a neural network refers to an algorithm (or a set of algorithms) that implements deep learning techniques to model high-level abstractions in data. In one or more embodiments, a neural network includes various layers such as an input layer, one or more hidden layers, and an output layer that each perform tasks for processing data. For example, a neural network includes a deep neural network, a convolutional neural network, a recurrent neural network (e.g., an LSTM), a graph neural network, or a large language model.

Relatedly, as used herein, the term "agent model" refers to an autonomous node that is part of or associated with a generative model architecture that reasons and acts autonomously within the larger generative model framework. In one or more embodiments, agent models augment a base generative model (e.g., a large language model) with specific components tooled for particular use cases, such as structured logic. For example, a large language model can contain agent models tooled for document summarization, chart generation, or technical document generation. In some implementations, agent models operate in isolation within a large language model to generate responses to task inputs. In one or more embodiments, agent models operate in concert to generate responses to task inputs within a multi-agent framework.

As further illustrated in FIG. 2, the self-optimizing prompt system 100 utilizes the relevant agent model 212 within the large language model 210 to produce a generated task output 214 from the system prompt 202 and the task input 206. In particular, the self-optimizing prompt system 100 leverages the relevant agent model 212 to produce the generated task output 214 that responds to the query of the task input 206 according to the instructions and directions included within the system prompt 202. For example, if the task input 206 requests summarization of a digital document and the system prompt 202 directs that citations to the digital document should be included within the summarization, the self-optimizing prompt system 100 utilizes the relevant agent model 212 to produce the generated task output 214 by summarizing the digital document with citations to the digital document. In some implementations, the self-optimizing prompt system 100 produces the generated task output 214 as a relevance score for a digital document associated with the task input 206.

As used herein, the term "generated task output" refers to an output of a machine learning model in response to a task input. In particular, a generated task output includes information generated and formatted by a machine learning model (e.g., a generative model) to respond to a prompt or query within the task input. For example, a generated task output can include a natural language summarization of a digital document. In another implementation, a generated task output can include a structured data representation (e.g., a chart and/or a table). In some implementations, the self-optimizing prompt system 100 produces a generated task output as digital object encoding information corresponding to the request output (e.g., a JSON or other digital object).

In one or more implementations, the self-optimizing prompt system 100 utilizes the relevant agent model 212 within the large language model 210 to generate a set of generated task outputs associated with the task input 206. In some embodiments, the self-optimizing prompt system 100 selects the generated task output 214 from the set of generated task outputs upon determining that the generated task output 214 best aligns with the task input 206. In some implementations, the self-optimizing prompt system 100 generates the set of generated task outputs in response to instructions within the system prompt 202 requesting multiple responses to the task input 206.

Figure 3:
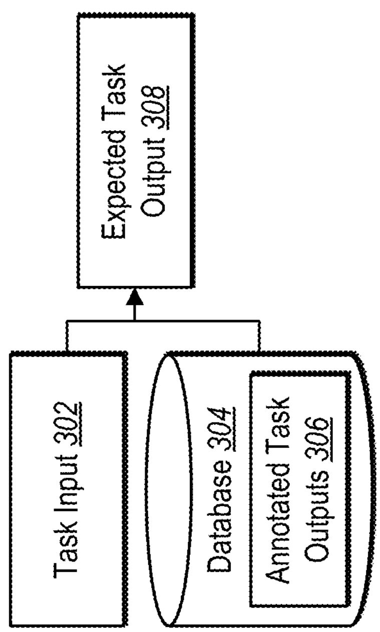
FIG. 3 illustrates the self-optimizing prompt system accessing an expected task output from a dataset of annotated task outputs in accordance with one or more embodiments.

As mentioned, in one or more embodiments, the self-optimizing prompt system 100 accesses an expected task output corresponding to a generated task output for analysis utilizing a meta-prompting model. FIG. 3 illustrates the self-optimizing prompt system 100 accessing an expected task output from a database of annotated task outputs in accordance with one or more embodiments.

As illustrated in FIG. 3, the self-optimizing prompt system 100 accesses an expected task output 308 from a database 304 including annotated task outputs 306. In particular, the self-optimizing prompt system 100 accesses the expected task output 308 by identifying a task output within the annotated task outputs 306 corresponding to a task input 302 (e.g., the task input 206 of FIG. 2). For example, if the task input 302 includes a request for summarization of a digital document, the self-optimizing prompt system 100 accesses the database 304 to identify the expected task output 308 within the annotated task outputs 306 as a summarization corresponding to the digital document (e.g., relevance labeling of digital documents in relation to a query and/or a summarization of the same digital document or of a similar digital document). In one or more embodiments, the self-optimizing prompt system 100 accesses the expected task output 308 as a ground-truth task output corresponding to the task input 302.

As used herein, the term "expected task output" refers to a ground-truth or expected output of a machine learning model in response to a specific task input. In particular, an expected task output includes a response to the task input that responds to the task input according to one or more expected parameters (e.g., parameters associated with a system prompt). In one or more embodiments, an expected task output includes one or more annotations explaining one or more characteristics of the expected task output rendering it suitable for responding to the task input. In some implementations, the self-optimizing prompt system 100 determines the expected task output as a suitable response to the task input by utilizing a machine learning model (e.g., a meta-prompting model) to compare the task input to the expected task output.

As used herein, the term "annotated task outputs" refers to a task output for a task input with one or more annotations detailing the suitability or deficiency of the task output. In particular, annotated task outputs include explanations or values indicating the relative suitability of the task output as compared to the task input. For example, in some implementations, an annotated task output includes a natural language description of reasons that the annotated task output is different than a generated task output. In one or more embodiments, an annotated task output includes a binary indication of the suitability of the task output (e.g., a binary value indicating suitability or lack of suitability). In some embodiments, the self-optimizing prompt system 100 generates annotations within the annotated task outputs utilizing an evaluator machine learning model (e.g., the meta-prompting model 114 of FIG. 1). In some implementations, an annotated task output is a real-time binary indication of suitability of a task output (e.g., a response to a request whether an output is suitable or an indication of whether a task output was viewed for longer than a threshold period of time).

In some implementations, the self-optimizing prompt system 100 accesses the annotated task outputs 306 from a dataset of annotated task outputs generated by human evaluators indicating the relative accuracy or relevance of a task output. In one or more additional embodiments, the self-optimizing prompt system 100 generates the annotated task outputs 306 by utilizing an evaluator machine learning model to annotate a set of task outputs automatically generated by a large language model.

Figure 4:
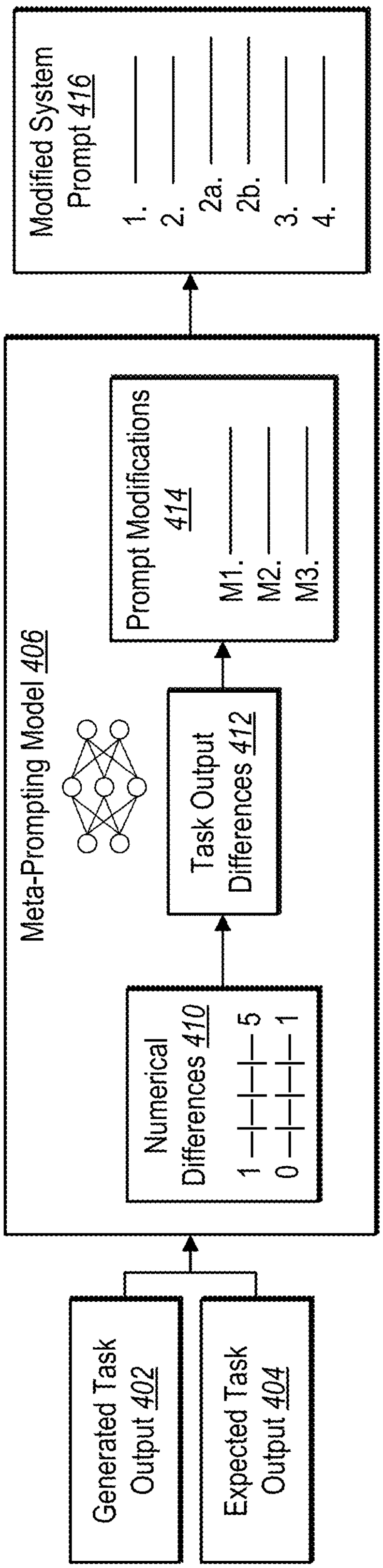
FIG. 4 illustrates the self-optimizing prompt system utilizing a meta-prompting model to generate a modified system prompt by incorporating one or more prompt modifications in accordance with one or more embodiments.

As mentioned, in one or more embodiments, the self-optimizing prompt system 100 utilizes a meta-prompting model to generate a modified system prompt in response to comparing a generated task output with an expected task output. FIG. 4 illustrates the self-optimizing prompt system 100 utilizing a meta-prompting model to generate a modified system prompt by incorporating one or more prompt modifications determined by comparing the generated task output with the expected task output in accordance with one or more embodiments.

As illustrated in FIG. 4, the self-optimizing prompt system 100 utilizes a meta-prompting model 406 to compare a generated task output 402 and an expected task output 404. In particular, the self-optimizing prompt system 100 utilizes the meta-prompting model 406 to determine one or more differences between the generated task output 402 and the expected task output 404. For example, if the generated task output 402 and the expected task output 404 both include summarizations of a digital document and the expected task output 404 includes a concise thesis sentence and a specific number of digital document citations and the generated task output 402 does not, the self-optimizing prompt system 100 leverages the meta-prompting model 406 to identify that the expected task output 404 includes these features while the generated task output 402 does not. In some embodiments, the self-optimizing prompt system 100 accesses a set of expected task outputs to compare with the generated task output 402 (e.g., fifty expected task outputs or one hundred expected task outputs). In one or more embodiments, the self-optimizing prompt system 100 identifies the generated task output 402 for further tuning in response to detecting that the generated task output 402 likely does not align with the expected task output 404 (e.g., in response to detecting that an evaluator has indicated a negative reaction to the generated task output 402).

As used herein, the term "meta-prompting model" refers to a machine learning model configured to assess the quality or correctness of an output of another machine learning model. In particular, a meta-prompting model leverages one or more rules to generate one or more quantifiable differences between a generated task output and an expected task output. For example, a meta-prompting evaluates a generated task output of an agent model within a large language model by utilizing rules to evaluate the generated task output according to one or more thresholds or criteria for a system prompt corresponding to a task input. In one or more embodiments, a meta-prompting model is a generative model or an agent model within a generative model architecture (e.g., as an agent model within the large language model 106 of FIG. 1).

As further illustrated in FIG. 4, the self-optimizing prompt system 100 utilizes the meta-prompting model 406 (or other model or function) to compare the generated task output 402 and the expected task output 404. In particular, the meta-prompting model 406 identifies and specifies relevant differences between the generated task output 402 and the expected task output 404. For example, the self-optimizing prompt system 100 utilizes the meta-prompting model 406 to compare the generated task output 402 and the expected task output 404 to evaluate the utilization or inclusion of a concise thesis sentence in the generated task output 402. In one or more embodiments, the self-optimizing prompt system 100 includes one or more specific thresholds or rules to guide the meta-prompting model 406. In some implementations, the meta-prompting model 406 determines a task output type of the generated task output 402 and the expected task output 404 to guide comparing the generated task output 402 with the expected task output 404. In some embodiments, the self-optimizing prompt system 100 utilizes the meta-prompting model 406 to emergently determine a strategy to guide generating the numerical differences 410 (e.g., by generating a decision tree).

In one or more embodiments, the self-optimizing prompt system 100 utilizes the meta-prompting model 406 to emergently determine how to compare the generated task output 402 with the expected task output 404 as an intermediate step of generating the task output differences 412. In particular, the self-optimizing prompt system 100 utilizes the meta-prompting model 406 to, in response to identifying the task defined within the generated task output 402 and the expected task output 404 (e.g., document summarization or chart generation), generate a set of thresholds and/or rules associated with the task defined by the task outputs.

As further illustrated in FIG. 4, the self-optimizing prompt system 100 determines numerical differences 410. In particular, the self-optimizing prompt system 100 generates the numerical differences 410 as quantifiable representations of differences between the generated task output 402 and the expected task output 404. In one or more embodiments, the self-optimizing prompt system 100 generates the numerical differences 410 to identify the presence or lack of an element within the generated task output 402 relative to the expected task output 404 (e.g., as a score of 0 or 1 for if the generated task output 402 includes a title). In some implementations, the self-optimizing prompt system 100 generates the numerical differences 410 as values that are different between the generated task output 402 and the expected task output 404 (e.g., if the generated task output 402 scores the relevance of a document to a query with a different score than the expected task output 404). In some embodiments, the self-optimizing prompt system 100 generates the numerical differences as a quantifiable representation of semantic differences between the generated task output 402 and the expected task output 404 (e.g., as a representation of the generated task output 402 being more verbose than the expected task output 404).

In some embodiments, the self-optimizing prompt system 100 analyzes a set of generated task outputs and utilizes the meta-prompting model 406 to generate the numerical differences 410 as a ranked list of the generated task outputs according to their similarities to the expected task output 404.

As further illustrated in FIG. 4, the self-optimizing prompt system 100 generates task output differences 412 to represent the numerical differences 410. In particular, the self-optimizing prompt system 100 generates the task output differences 412 by utilizing the meta-prompting model 406 to aggregate the numerical differences 410. For example, if the numerical differences 410 include both values indicating semantic differences between the generated task output 402 and the expected task output 404 as well as discrepancies in relevancy labels within the generated task output 402 and the expected task output 404, the self-optimizing prompt system 100 generates the task output differences 412 as a string of values indicating both of the numerical differences.

As used herein, the term "task output differences" refers to a collection or list of differences between a generated task output and an expected task output. In particular, task output differences indicate task response-relevant differences between the generated task output and the expected task output. For example, in one or more embodiments, the task output differences are formatted as a quantifiable representation of differences between the generated task output 402 and the expected task output 404.

As further illustrated in FIG. 4, the self-optimizing prompt system 100 utilizes the meta-prompting model 406 to determine prompt modifications 414 from the task output differences 412 (e.g., in relation to a particular task input and system prompt to an agent model as described previously). In particular, the self-optimizing prompt system 100 utilizes the meta-prompting model 406 to determine the prompt modifications 414 by leveraging the qualitative differences contained within the task output differences 412 to adjust the system prompt so as to produce a generated task output that more closely aligns with the expected task output 404. In one or more embodiments, the self-optimizing prompt system 100 utilizes the meta-prompting model to generate the prompt modifications 414 as instructions to modify a system prompt (e.g., the system prompt 202 of FIG. 2) to reduce the values within the task output differences 412 between the generated task output 402 and the expected task output 404. For example, if the task output differences 412 include values indicating the lack of a concise thesis sentence within the generated task output 402, the meta-prompting model 406 generates the prompt modifications 414 as instructions to modify a system prompt to generate a task output that aligns with the expected task output 404, thereby reducing the value of the differences within the task output differences 412.

As further illustrated in FIG. 4, the self-optimizing prompt system 100 generates a modified system prompt 416 according to the prompt modifications 414. In particular, the self-optimizing prompt system 100 generates the modified system prompt 416 by leveraging the meta-prompting model 406 to apply the prompt modifications 414 to a system prompt (e.g., the system prompt 202 of FIG. 2). For example, if the prompt modifications 414 detail that the system prompt should be modified to request a concise thesis within a summarization of a digital document, the self-optimizing prompt system 100 utilizes the meta-prompting model 406 to generate the modified system prompt 416 so that the modified system prompt 416 includes instructions to generate a concise thesis sentence within a generated summarization. In one or more embodiments, the self-optimizing prompt system 100 generates the modified system prompt 416 by defining one or more additional rules governing execution of a system prompt and inserting the one or more additional rules into the modified system prompt 416. In some implementations, the self-optimizing prompt system 100 generates the modified system prompt 416 according to an evaluation rubric guiding edits to a prior system prompt to generate the modified system prompt 416.

In some implementations, the self-optimizing prompt system 100 generates, by utilizing the meta-prompting model 406 to analyze the prompt modifications 414, an unsuitability determination defining that the initial system prompt (e.g., the system prompt 202 of FIG. 2) is unsuitable to producing a task output corresponding to the expected task output 404. In one or more embodiments, the self-optimizing prompt system 100 utilizes the meta-prompting model 406 to generate, from the prompt modifications 414 and in response to the unsuitability determination, a new system prompt aligning with the requirements detailed within the prompt modifications 414. In some implementations, the self-optimizing prompt system 100 utilizes the meta-prompting model 406 to access a second system prompt from a system prompt repository and modify the second system prompt according to the prompt modifications 414 in response to the unsuitability determination.

Figure 5:
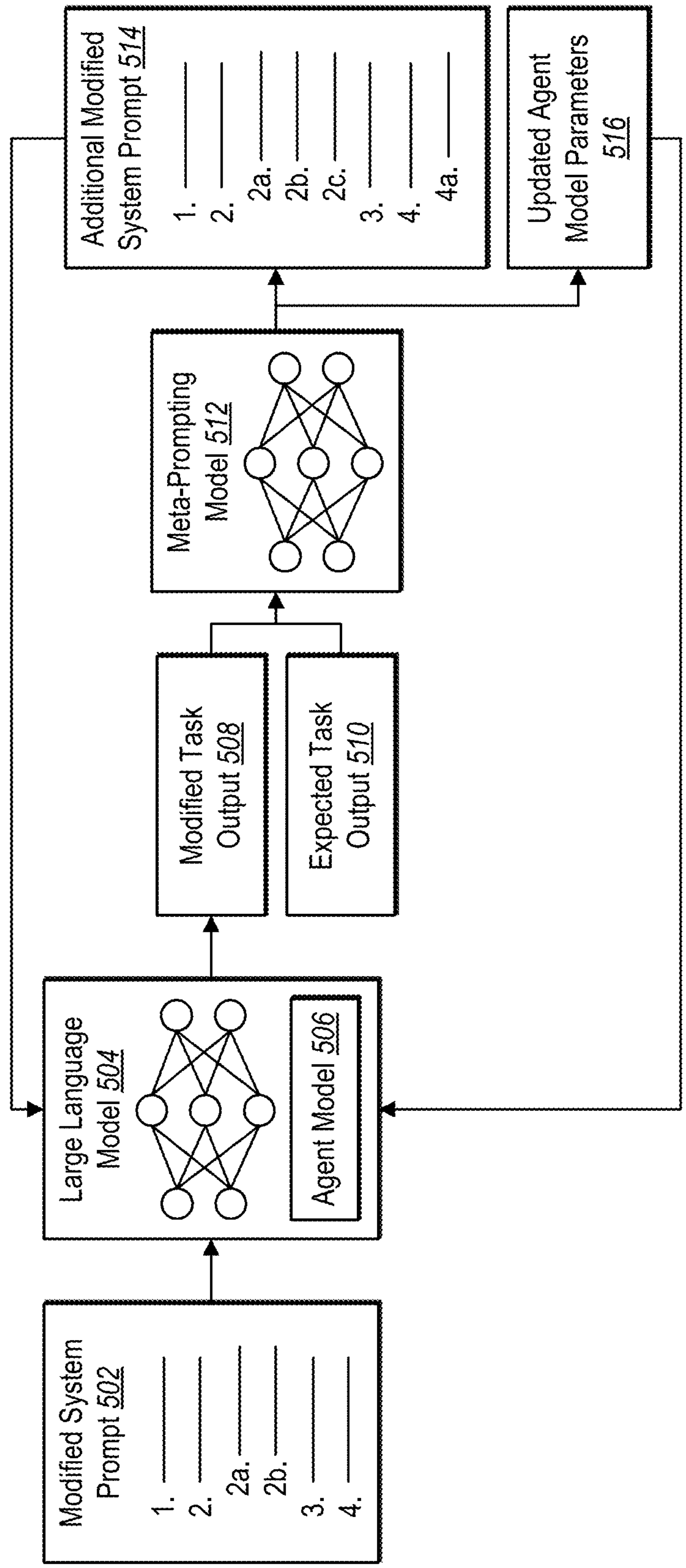
FIG. 5 illustrates the self-optimizing prompt system utilizing a meta-prompting model to iteratively update a modified system prompt in accordance with one or more embodiments.

As mentioned, in one or more embodiments, the self-optimizing prompt system 100 iteratively updates a system prompt based on an expected task output of an agent model. FIG. 5 illustrates the self-optimizing prompt system 100 utilizing a meta-prompting model to adjust a modified system prompt to generate an additional modified system prompt in accordance with one or more embodiments.

As illustrated in FIG. 5, the self-optimizing prompt system 100 utilizes an agent model 506 within a large language model 504 to generate a modified task output 508 from a modified system prompt 502. In particular, the self-optimizing prompt system 100 utilizes the agent model 506 to generate the modified task output 508 according to the modified system prompt 502 and a task input (e.g., the task input 206 of FIG. 2). In some implementations, the self-optimizing prompt system 100 generates the modified task output 508 to respond to the task input according to the directions stored within the modified system prompt 502. In one or more implementations, the self-optimizing prompt system 100 generates the modified task output 508 from the modified system prompt 502 after a previous iteration of updating the system prompt by generating the modified system prompt 502 (e.g., by generating the modified system prompt 416 of FIG. 4).

As further illustrated in FIG. 5, the self-optimizing prompt system 100 utilizes a meta-prompting model 512 to compare the modified task output 508 with an expected task output 510 to generate an additional modified system prompt 514. In particular, the self-optimizing prompt system 100 generates the additional modified system prompt 514 by utilizing the meta-prompting model 512 to identify one or more characteristics of the expected task output 510 not present in the modified task output 508 and modifying the modified system prompt 502 to include instructions associated with producing the expected task output 510. For example, if the modified system prompt 502 is associated with document summarization and the modified task output 508 exceeds a set summarization length threshold (e.g., 5 sentences) and the expected task output 510 falls within the summarization length threshold, the self-optimizing prompt system 100 utilizes the meta-prompting model 512 to generate the additional modified system prompt 514 with instructions to limit document summarization tasks to the set summarization length threshold.

In some implementations, the self-optimizing prompt system 100 further updates the additional modified system prompt 514. For example, the self-optimizing prompt system 100 utilizes the framework described in FIG. 5 to iteratively adjust a system prompt more closely resemble the expected task output 510. In one or more embodiments, the self-optimizing prompt system 100 utilizes the agent model 506 within the large language model 504 to generate an additional modified task output from the additional modified system prompt 514. In some implementations, the self-optimizing prompt system 100 then utilizes the meta-prompting model 512 to compare the additional modified task output with the expected task output to determine whether to generate a further modified system prompt to more closely align the output with the expected task output 510. In some implementations, the self-optimizing prompt system 100 performs a set number of iterations to adjust a system prompt to produce task outputs more closely resembling the expected task output 510. In some embodiments, the self-optimizing prompt system 100 performs iterations to adjust a system prompt until the system prompt falls within a threshold degree of divergence of the expected task output 510.

In some implementations, the self-optimizing prompt system 100 additionally utilizes the meta-prompting model 512 (or a separate system or model) to generate updated agent model parameters 516 associated with the additional modified system prompt 514. In particular, the self-optimizing prompt system 100 generates the updated agent model parameters 516 as additional rules or executable instructions defining execution of the agent model 506 aligned with the additional modified system prompt 514. For example, the self-optimizing prompt system 100 generates the updated agent model parameters 516 in response to determining that the agent model 506 called an unsuitable machine-learning model version to generate the modified task output 508, with the updated agent model parameters 516 calling a suitable machine-learning model to more closely align a generated output with the expected task output 510.

In some embodiments, the self-optimizing prompt system 100 performs the iterative process depicted in FIG. 5 each time a system prompt is called (e.g., in response to a task input requesting the execution of an agent model associated with a system prompt). In some implementations, the self-optimizing prompt system 100 automatically generates the additional modified system prompt 514 over several iterations upon determining that an additional task output is insufficient (e.g., in response to receiving feedback that the task output does not align with expectations). In some embodiments, the self-optimizing prompt system 100 automatically compares a generated task output with a rubric to determine whether the generated task output falls within a threshold deviation from an expected task output and, if not, automatically generates the additional modified system prompt 514 over several iterations.

Figure 6:
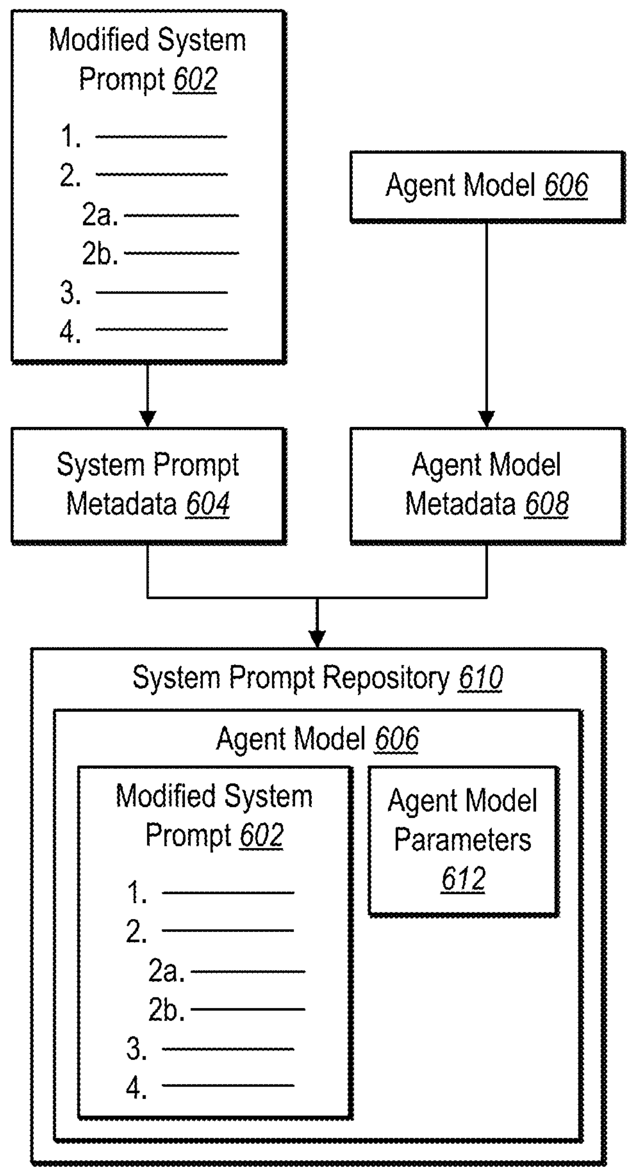
FIG. 6 illustrates the self-optimizing prompt system storing the modified system prompt for an agent model in a system prompt repository in accordance with one or more embodiments.

As mentioned, in one or more embodiments, the self-optimizing prompt system 100 stores a modified system prompt within a system prompt repository for use with future task inputs to one or more agent models. FIG. 6 illustrates the self-optimizing prompt system 100 storing a modified system prompt in a system prompt repository with associated agent model data in accordance with one or more embodiments.

As illustrated in FIG. 6, the self-optimizing prompt system 100 accesses a modified system prompt 602 and identifies system prompt metadata 604 associated with the modified system prompt 602. In particular, the self-optimizing prompt system 100 accesses the system prompt metadata 604 to determine characteristics associated with the modified system prompt 602 (e.g., the task with which the modified system prompt is associated and/or processing or computing power requirements to execute the modified system prompt 602). In some implementations, the self-optimizing prompt system 100 accesses the system prompt metadata 604 from within the modified system prompt 602. In one or more embodiments, the self-optimizing prompt system 100 accesses the system prompt metadata 604 from a database of system prompts (e.g., the database 1012 of FIG. 10).

As further illustrated in FIG. 6, the self-optimizing prompt system 100 accesses, from an agent model 606, agent model metadata 608. In particular, the self-optimizing prompt system 100 utilizes the agent model metadata 608 to determine one or more characteristics associated with the agent model 606 (e.g., tasks with which the agent model is associated and/or processing capabilities of the agent model 606). In some implementations, the self-optimizing prompt system 100 identifies the agent model 606 by comparing the agent model metadata 608 with the system prompt metadata 604 and identifying the agent model 606 as suitable for executing the modified system prompt 602.

As further illustrated in FIG. 6, the self-optimizing prompt system 100 accesses a system prompt repository 610 including system prompts for various tasks utilizing one or more agent models. In particular, the self-optimizing prompt system 100 accesses, within the system prompt repository 610, the agent model 606. In some implementations, the self-optimizing prompt system 100 identifies the agent model 606 aligned with the modified system prompt 602. In one or more embodiments, the self-optimizing prompt system 100 identifies the agent model 606 from a set of agent models within the system prompt repository 610 according to the agent model metadata 608 and the system prompt metadata 604.

As used herein, the term "system prompt repository" refers to a storage system designed to store system prompts designed for execution in association with utilizing agent models to perform task execution. In particular, a system prompt repository is a structured data storage repository that stores data associated with a set of agent models (e.g., routing data to call an agent model, metadata associated with an agent model, and/or the entirety of an agent model). In some implementations, the system prompt repository includes prompts configured to execute automatically upon invocation of an agent model, including system prompts.

As further illustrated in FIG. 6, the self-optimizing prompt system 100 stores the modified system prompt 602 within the agent model 606 along with agent model parameters 612. In particular, the self-optimizing prompt system 100 stores the modified system prompt 602 so that, when the agent model 606 is called for a generation task, the agent model 606 executes the modified system prompt 602 according to the agent model parameters 612 to generate the task output associated with the generation task. For example, if the agent model 606 is called in relation with summarizing a document, the self-optimizing prompt system 100 utilizes the agent model 606 to generate the document summarization according to the instructions included within the modified system prompt 602 and the agent model parameters 612. Furthermore, in one or more embodiments, the self-optimizing prompt system 100 can access a particular prompt-model pair (e.g., a mapping of a stored system prompt and an agent model) in response to receiving a particular task linked to the prompt-model pair and route a query to the corresponding agent model using the stored system prompt. Thus, the self-optimizing prompt system 100 can perform intelligent routing to specific agent models with ready-to-use system prompts for given task inputs to produce accurate task outputs.

In one or more embodiments, the self-optimizing prompt system 100 stores the modified system prompt 602 in association with multiple agent models. For example, if the modified system prompt 602 is associated with the task of chart generation and there are multiple agent models configured for chart generation, the self-optimizing prompt system 100 stores the modified system prompt 602 within multiple sets of agent models associated with chart generation. In some implementations, the self-optimizing prompt system 100 automatically adjusts and tools the modified system prompt 602 to adjust to multiple sets of agent models associated with the task defined by the modified system prompt 602.

Figure 7:
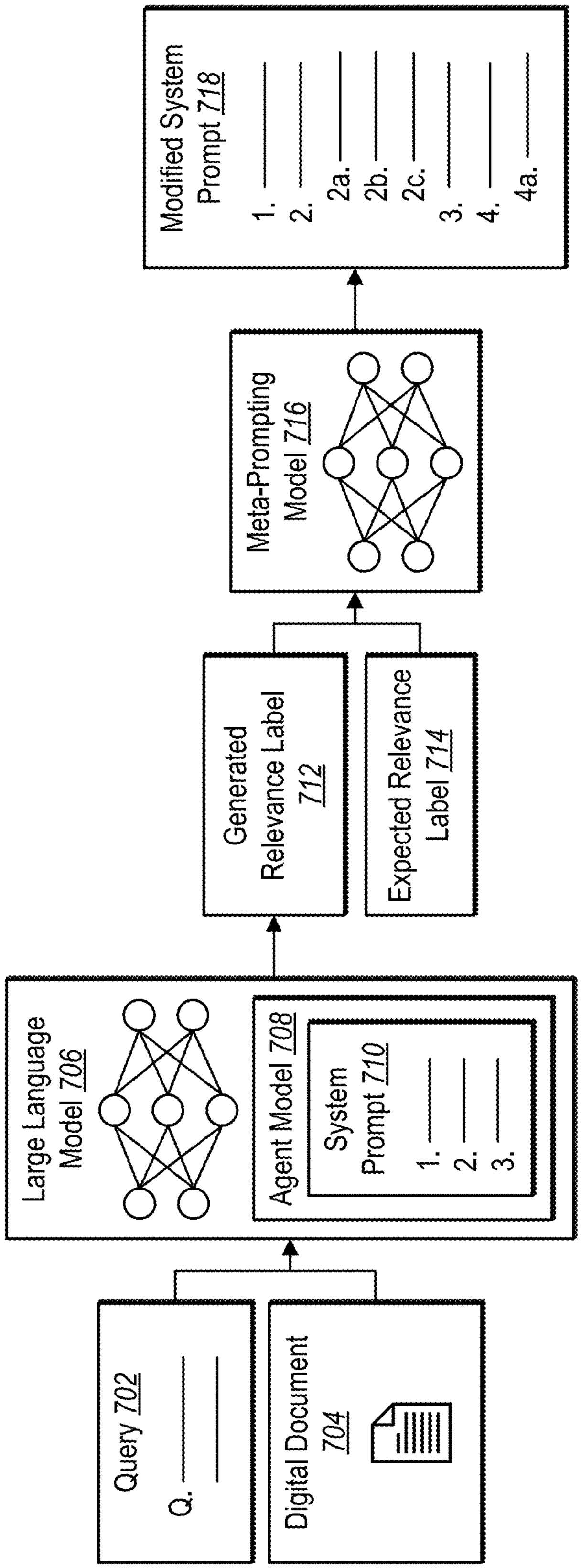
FIG. 7 illustrates the self-optimizing prompt system utilizing a system prompt to generate relevance labels for query-document pairs and utilizing the meta-prompting model to generate a modified system prompt for generating relevance labels in accordance with one or more embodiments.

As mentioned, in one or more embodiments, the self-optimizing prompt system 100 generates a modified system prompt to improve the capability of an agent model to generate relevance labels for a query-digital document pair, which the self-optimizing prompt system 100 can use to train an large language model. FIG. 7 illustrates the self-optimizing prompt system 100 utilizing a meta-prompting model to generate a modified system prompt in response to an agent model generating a relevance label for a query-digital document pair.

As illustrated in FIG. 7, the self-optimizing prompt system 100 accesses a query 702 with a digital document 704. In particular, the self-optimizing prompt system 100 accesses the query 702 and the digital document 704 as a query-digital document pair, with the digital document 704 intended to include the answer to the query 702. For example, if the query 702 requests information on a certain city, the digital document 704 could be a history book about the city referenced within the query 702. In one or more embodiments, the self-optimizing prompt system 100 accesses the query 702 and the digital document 704 from a database (e.g., the database 1012 of FIG. 10).

As further illustrated in FIG. 7, the self-optimizing prompt system 100 utilizes an agent model 708 within a large language model 706 to produce a generated relevance label 712 for the digital document 704 in light of the query 702. In particular, the self-optimizing prompt system 100 produces the generated relevance label 712 by executing a system prompt 710 within the agent model 708 to analyze whether the digital document 704 is relevant to the query 702. In one or more embodiments, the self-optimizing prompt system 100 produces the generated relevance label 712 as a value indicating the relative relevance of the digital document 704 to the query 702 according to the instructions delineated within the system prompt 710. For example, if the query 702 is about the best locations to visit within a city and the digital document 704 is a history book about the city referenced within the query 702, the self-optimizing prompt system 100 executes the system prompt 710 to guide the agent model 708 to produce the generated relevance label 712 indicating that the digital document 704 is somewhat relevant to the query 702 (e.g., by generating a score of 3 within a scale of 1-5).

As further illustrated in FIG. 7, the self-optimizing prompt system 100 utilizes a meta-prompting model 716 to compare the generated relevance label 712 with the expected relevance label 714. In particular, the self-optimizing prompt system 100 accesses the expected relevance label 714 as a ground-truth or golden value indicating the relevance of the digital document 704 to the query 702. In some embodiments, the expected relevance label 714 is generated by human evaluators. In one or more implementations, the expected relevance label 714 is generated by an evaluator large language model. For example, in the example described above wherein the query 702 relates to best locations to visit within a city and the digital document 704 is a history book about the city, the expected relevance label 714 is a ground-truth indication of relevance (e.g., a score of 5 on a scale of 1-5 if the city is well-known for its historical sites or a score of 1 on a scale of 1-5 if the city does not include any notable historical sites).

As further illustrated in FIG. 7, the self-optimizing prompt system 100 utilizes the meta-prompting model 716 to generate a modified system prompt 718 in response to comparing the generated relevance label 712 and the expected relevance label 714. In particular, the self-optimizing prompt system 100 generates the modified system prompt 718 as a modified version of the system prompt 710 intended to reduce the differences between the generated relevance label 712 and the expected relevance label 714. For example, continuing the above example, if the expected relevance label 714 comprises a score of 5 on a scale of 1-5 because the city is well-known for its historical sites and the generated relevance label 712 comprises a score of 3 on a scale of 1-5, the self-optimizing prompt system 100 utilizes the meta-prompting model 716 to generate the modified system prompt 718 with instructions for the agent model 708 to consider whether the city included within the query 702 is well-known for historical sites.

As mentioned, in one or more embodiments, the self-optimizing prompt system 100 expands upon a system prompt to improve the ability of an agent model to generate task outputs. FIGS. 8A-8B illustrate sample system prompts in connection with modifying a system prompt utilizing a meta-prompting model, as described previously. FIG. 8A illustrates a first system prompt before modification by the self-optimizing prompt system 100 in accordance with one or more embodiments. FIG. 8B illustrates a modified system prompt following modification by the self-optimizing prompt system 100 (e.g., utilizing a meta-prompting model) in accordance with one or more embodiments.

As illustrated in FIG. 8A, the self-optimizing prompt system 100 accesses a first system prompt 802. In particular, the self-optimizing prompt system 100 utilizes the first system prompt 802 as an initial starting point for further iteration and modification to better generate task outputs. As illustrated in FIG. 8A, the self-optimizing prompt system 100 identifies, within the first system prompt 802, one or more instructions defining execution of a task input by an agent model. For example, the first system prompt 802 includes instructions such as a role (employee of a company), assumptions (assuming that queries are motivated to find recent, reliable, and authoritative information), prioritization (prioritizing long form documents), rules, and considerations (user intent).

As illustrated in FIG. 8B, the self-optimizing prompt system 100 generates a modified system prompt 804. As illustrated, the self-optimizing prompt system 100 generates the modified system prompt 804 from the first system prompt 802 by adding additional detail to roles (specifying that the employee is a neutral evaluator), setting a fixed sequence of records, defining a task, and generating a set of evaluation procedures. As illustrated, the self-optimizing prompt system 100 generates the modified system prompt 804 by generating additional specifications leading to more precise and detailed responses associated with specific tasks.

Figure 9:
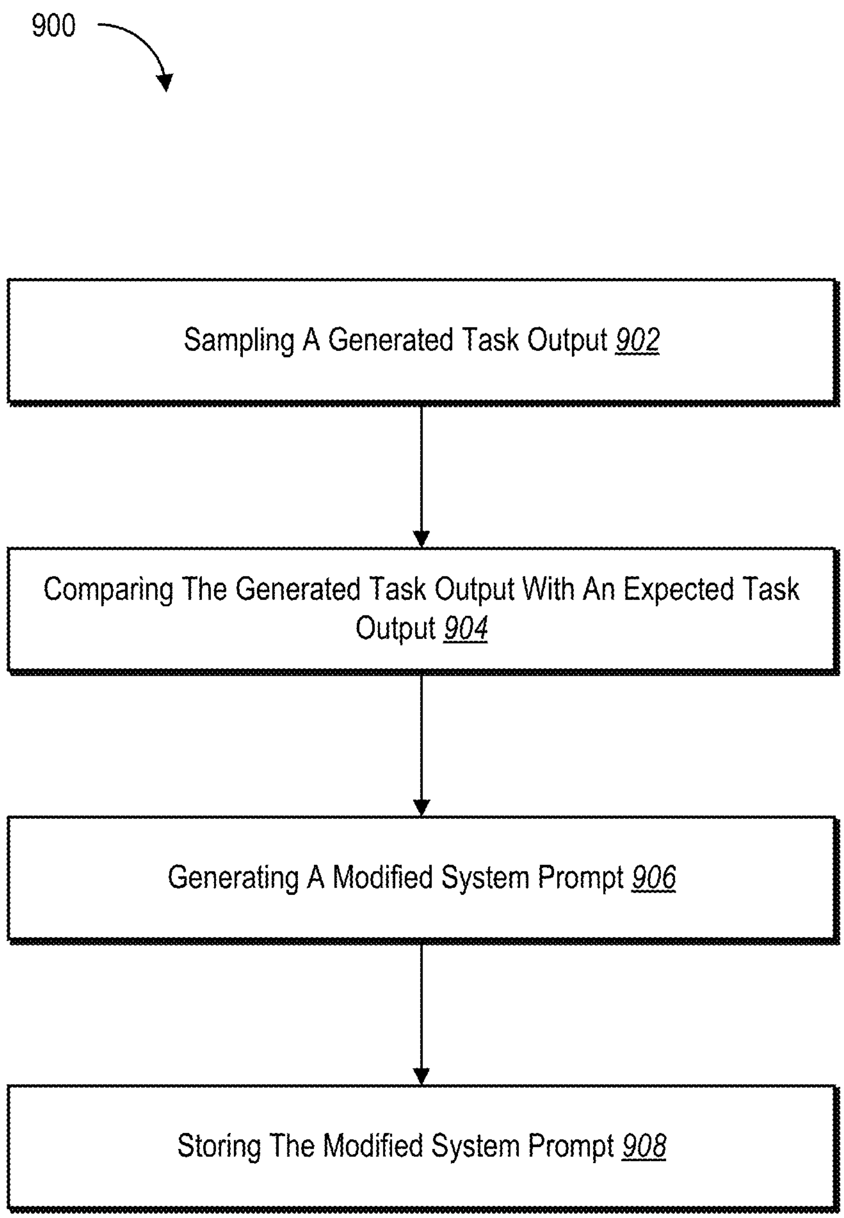
FIG. 9 illustrates a flowchart of a series of acts for generating and storing a modified system prompt utilizing a meta-prompt model in accordance with one or more embodiments.

FIGS. 1-8, the corresponding text and the examples provide a number of different methods, systems, devices, and non-transitory computer-readable media of the self-optimizing prompt system 100. In addition to the foregoing, one or more embodiments can also be described in terms of flowcharts comprising acts for accomplishing particular results, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for generating and storing a modified system prompt in accordance with one or more embodiments. FIG. 9 illustrates acts according to one embodiment, but alternative embodiments may omit, add to, reorder, and/or modify any of the acts shown in FIG. 9. In some implementations, the acts of FIG. 9 are performed as part of a method, such as a computer-implemented method. Alternatively, a non-transitory computer-readable medium can store instructions thereon that, when executed by at least one processor, cause the at least one processor to perform the acts of FIG. 9. In some embodiments, a system performs the acts of FIG. 9. For example, in one or more embodiments, a system includes at least one processor. The system further includes a non-transitory computer-readable medium storing instructions that, when executed by the at least one processor, cause the system to perform the acts of FIG. 9.

The series of acts 900 includes an act 902 of producing a generated task output. For instance, in one or more embodiments, the act 902 involves producing a generated task output using an agent model operating on a first system prompt and a task input.

The series of acts 900 also includes an act 904 of comparing the generated task output with an expected task output. For example, in one or more embodiments, the act

904 involves comparing, using a meta-prompting model, the generated task output with an expected task output corresponding to the task input.

The series of acts 900 also includes an act 906 of generating a modified system prompt. For example, in some embodiments, the act 906 involves generating, based on comparing the generated task output with the expected task output, a modified system prompt for the agent model by using the meta-prompting model to modify the first system prompt.

The series of acts 900 also includes an act 908 of storing the modified system prompt. For example, in some embodiments, the act 908 involves storing the modified system prompt in association with the agent model in a system prompt repository.

For example, the series of acts 900 can include acts to perform any of the operations described in the following clauses:

CLAUSE 1: A method comprising:
- sampling a generated task output produced by an agent model operating on a first system prompt and a task input;
- comparing, using a meta-prompting model, the generated task output with an expected task output corresponding to the task input;
- generating, based on comparing the generated task output with the expected task output, a modified system prompt for the agent model by using the meta-prompting model to modify the first system prompt; and
- storing the modified system prompt in association with the agent model in a system prompt repository.

CLAUSE 2: The method of clause 1, wherein sampling the generated task output comprises:
- receiving, within an agentic prompt response architecture, the task input as an input pair comprising a query and a digital document; and
- calling the agent model to produce the generated task output by generating a relevance score indicating relevance of the digital document to the query.

CLAUSE 3: The method of clauses 1-2, wherein comparing the generated task output with the expected task output comprises:
- accessing the expected task output from a dataset of annotated task outputs; and
- determining, by comparing the generated task output with the expected task output, a task output difference between the generated task output and the expected task output.

CLAUSE 4: The method of any of the preceding clauses, wherein determining the task output difference comprises:
- determining, by utilizing the meta-prompting model, a quantifiable representation of semantic differences between the generated task output and the expected task output; or
- determining, by utilizing the meta-prompting model, one or more numerical differences between the generated task output and the expected task output.

CLAUSE 5: The method of any of the preceding clauses, wherein generating the modified system prompt comprises:
- detecting a first prompt modification by utilizing the meta-prompting model to compare the generated task output with the expected task output;
- detecting a second prompt modification by utilizing the meta-prompting model to compare the generated task output with the expected task output; and
- generating the modified system prompt by utilizing the meta-prompting model to modify the first system prompt according to the first prompt modification and the second prompt modification.

CLAUSE 6: The method of any of the preceding clauses, further comprising:
- generating a modified task output from the modified system prompt;
- comparing, using the meta-prompting model, the modified task output for the agent model with the expected task output corresponding to the task input; and
- generating, based on comparing the modified task output with the expected task output, an additional modified system prompt by utilizing the meta-prompting model to further modify the modified system prompt.

CLAUSE 7: The method of any of the preceding clauses, further comprising:
- determining, from the modified system prompt, a relevant agent model within a multi-agent framework corresponding to characteristics of the modified system prompt; and
- generating a response to the task input by utilizing the relevant agent model according to the modified system prompt.

CLAUSE 8: The method of any of the preceding clauses, wherein storing the modified system prompt comprises:
- determining, by comparing the modified system prompt and model metadata of the agent model, that the modified system prompt corresponds to the agent model; and
- storing, in the system prompt repository, the modified system prompt with a set of prompts for a set of tasks corresponding to the agent model.

CLAUSE 9: A system comprising:
- at least one processor; and
- at least one non-transitory computer-readable storage medium storing instructions that, when executed by the at least one processor, cause the system to:
  - sample a generated task output produced by an agent model operating on a first system prompt and a task input;
  - compare, using a meta-prompting model, the generated task output with an expected task output corresponding to the task input;
  - generate, based on comparing the generated task output with the expected task output, a modified system prompt for the agent model by using the meta-prompting model to modify the first system prompt; and
  - store the modified system prompt in association with the agent model in a system prompt repository.

CLAUSE 10: The system of any of the preceding clauses, further comprising instructions that, when executed by the at least one processor, cause the system to sample the generated task output by:
- receiving the task input as an input pair comprising a query and a digital document;
- accessing the first system prompt in response to determining that the input pair includes characteristics corresponding to the agent model; and
- producing the generated task output by utilizing the agent model to generate a relevance score indicating relevance of the digital document to the query.

CLAUSE 11: The system of any of the preceding clauses, further comprising instructions that, when executed by the at least one processor, cause the system to compare the generated task output with the expected task output by determining a task output difference between the generated task output and the expected task output.

CLAUSE 12: The system of any of the preceding clauses, further comprising instructions that, when executed by the at least one processor, cause the system to determine the task output difference by:

determining, by utilizing the meta-prompting model, one or more differences between the generated task output and the expected task output; and generating a meta-prompting description of the one or more differences as:

one or more quantifiable representations of semantic differences; or one or more numerical differences.

CLAUSE 13: The system of any of the preceding clauses, further comprising instructions that, when executed by the at least one processor, cause the system to generate the modified system prompt by:

detecting a set of prompt modifications by utilizing the meta-prompting model to compare the generated task output with the expected task output; and generating the modified system prompt by utilizing the meta-prompting model to modify the first system prompt according to the set of prompt modifications.

CLAUSE 14: The system of any of the preceding clauses, further comprising instructions that, when executed by the at least one processor, cause the system to:

generate a modified task output from the modified system prompt;

compare, using the meta-prompting model, the modified task output for the agent model with the expected task output corresponding to the task input;

generate, based on comparing the modified task output with the expected task output, an additional modified system prompt by utilizing the meta-prompting model to further modify the modified system prompt;

determine, from the additional modified system prompt, a relevant agent model within a multi-agent framework corresponding to characteristics of the additional modified system prompt; and generate a response to the task input by utilizing the relevant agent model according to the additional modified system prompt.

CLAUSE 15: A non-transitory computer-readable medium storing instructions that, when executed by at least one processor, cause a computer system to:

sample a generated task output produced by an agent model operating on a first system prompt and a task input;

compare, using a meta-prompting model, the generated task output with an expected task output corresponding to the task input;

generate, based on comparing the generated task output with the expected task output, a modified system prompt for the agent model by using the meta-prompting model to modify the first system prompt; and store the modified system prompt in association with the agent model in a system prompt repository.

CLAUSE 16: The non-transitory computer-readable medium of any of the preceding clauses, further comprising instructions that, when executed by the at least one processor, cause the computer system to store the modified system prompt by:

determining, by comparing the modified system prompt and model metadata of the agent model, that the modified system prompt corresponds to the agent model; and storing, in the system prompt repository, the modified system prompt with a set of prompts for a set of tasks corresponding to the agent model.

CLAUSE 17: The non-transitory computer-readable medium of any of the preceding clauses, further comprising instructions that, when executed by the at least one processor, cause the computer system to compare the generated task output with the expected task output by:

accessing the expected task output from a dataset of annotated task outputs; and determining, by comparing the generated task output with the expected task output, a task output difference between the generated task output and the expected task output, the task output difference comprising:

one or more quantifiable representations of semantic differences between the generated task output and the expected task output; or one or more numerical differences between the generated task output and the expected task output.

CLAUSE 18: The non-transitory computer-readable medium of any of the preceding clauses, further comprising instructions that, when executed by the at least one processor, cause the computer system to generate the modified system prompt by:

detecting a first set of prompt modifications by utilizing the meta-prompting model to compare the generated task output with the expected task output;

detecting a second set of prompt modifications by utilizing the meta-prompting model to compare the generated task output with the expected task output; and generating the modified system prompt by utilizing the meta-prompting model to modify the first system prompt to align with the first set of prompt modifications and the second set of prompt modifications.

CLAUSE 19: The non-transitory computer-readable medium of any of the preceding clauses, further comprising instructions that, when executed by the at least one processor, cause the computer system to:

generate, by comparing a modified task output generated from the modified system prompt for the agent model with the expected task output corresponding to the task input, a first additional modified system prompt by utilizing the meta-prompting model to further modify the modified system prompt; and generate, by comparing a first additional modified task output generated from the first additional modified system prompt for the agent model with the expected task output corresponding to the task input, a second additional modified system prompt by utilizing the meta-prompting model to further modify the first additional modified system prompt.

CLAUSE 20: The non-transitory computer-readable medium of any of the preceding clauses, further comprising instructions that, when executed by the at least one processor, cause the computer system to sample the generated task output by selecting the generated task output produced by the agent model generating a relevance score indicating relevance of a digital document to a query within the task input.

Figure 10:
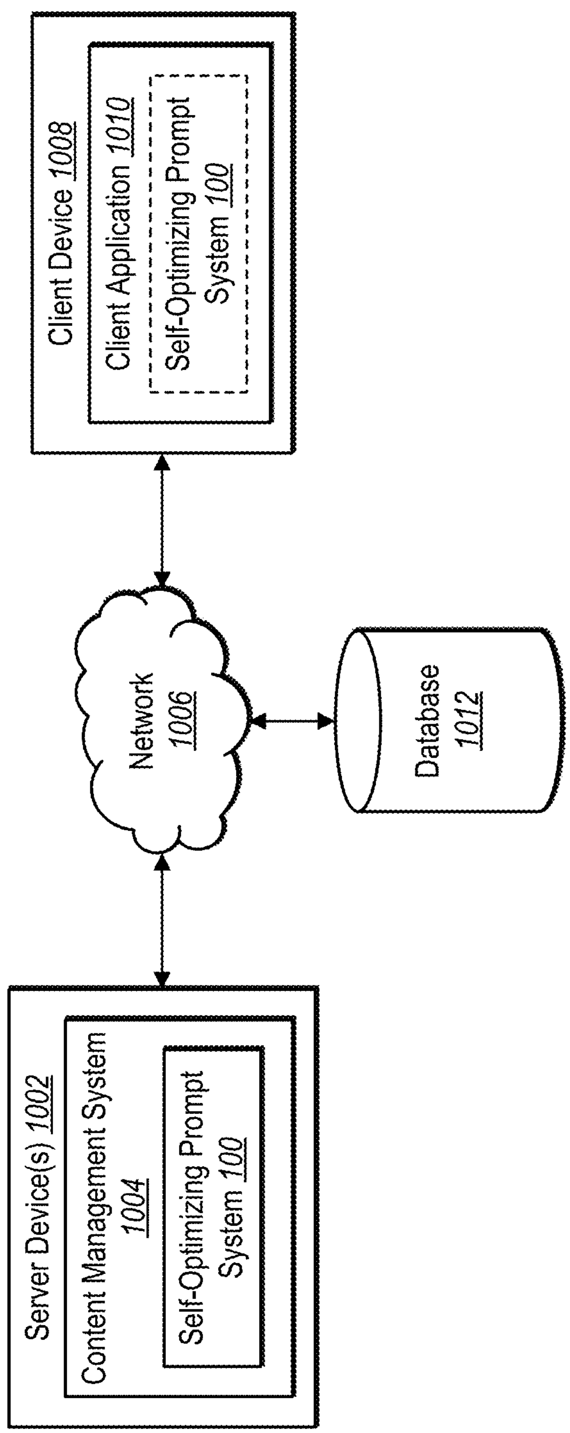
FIG. 10 illustrates an example environment within which a self-optimizing prompt system can operate in accordance with one or more embodiments.

Additional detail regarding the environment within which one or more embodiments of the self-optimizing prompt system 100 operates will now be provided. In particular, FIG. 10 illustrates a block diagram of a system environment ("environment") for implementing the self-optimizing prompt system 100 in accordance with one or more embodiments. As illustrated in FIG. 10, the environment includes a server device(s) 1002, a network 1006, a database 1012, and a client device 1008.

Although the environment of FIG. 10 is depicted as having a particular number of components, the environment can have any number of additional or alternative components (e.g., a different number of server devices, client devices, or other components in communication with the self-optimizing prompt system 100 via the network 1006). Similarly, although FIG. 10 illustrates a particular arrangement of the server device(s) 1002, the network 1006, the database 1012, and the client device 1008, various additional arrangements are possible.

The server device(s) 1002, the network 1006, the database 1012, and the client device 1008 can be communicatively coupled with each other either directly or indirectly (e.g., through the network 1006 as discussed in greater detail below in relation to FIG. 12). Moreover, the server device(s) 1002 and the client device 1008 may include a variety of computing devices (including one or more computing devices as discussed in greater detail with relation to FIG. 12).

As mentioned, the environment includes the server device(s) 1002. In one or more embodiments, the server device(s) 1002 generates, stores, receives, and/or transmits digital data, including task inputs, task outputs, and system prompts. For example, the server device(s) 1002 can receive, from the client device 1008, a task input associated with a digital document. In response, the server device(s) 1002 can generate a modified system prompt corresponding to the task input. In one or more embodiments, the server device(s) 1002 comprises a data server device. In some embodiments, the server device(s) 1002 comprises a communication server device or a web-hosting server device. In some embodiments, the server device(s) 1002 accesses data from another environment location (e.g., the database 1012) to generate the modified system prompt (e.g., by accessing expected task outputs for comparison).

As shown, the server device(s) 1002 includes the content management system 1004. In one or more embodiments, the content management system 1004 provides a collection of features (e.g., services). For instance, the content management system 1004 can provide features related to the creation, storage, and/or management of digital files. Further, the content management system 1004 can include user accounts. The content management system 1004 can facilitate communication between user accounts, such as communication involving the sharing of digital files among the user accounts.

Additionally, the server device(s) 1002 includes the self-optimizing prompt system 100. In one or more embodiments the self-optimizing prompt system 100 utilizes the server device(s) 1002 to generate modified system prompts. Further, in some embodiments, the self-optimizing prompt system 100 uses the server device(s) 1002 to iteratively modify and update system prompts.

In one or more embodiments, the client device 1008 includes a computing device that can access the content management system 1004 (e.g., to utilize the features offered). For example, in some implementations, the client device 1008 includes at least one of a smartphone, a tablet, a desktop computer, a laptop computer, a head-mounted-display device, or other electronic device. In some instances, the client device 1008 includes one or more applications (e.g., the client application 1010) that can access the content management system 1004 (e.g., to utilize the features offered). For example, in some embodiments, the client application 1010 includes a software application installed on the client device 1008. In other cases, however, the client application 1010 includes a software application hosted on the server device(s) 1002 (and supported by the content management system 1004), which is accessible by the client device 1008 through another application, such as a web browser.

The self-optimizing prompt system 100 can be implemented in whole, or in part, by the individual elements of the environment. Indeed, although FIG. 10 illustrates the self-optimizing prompt system 100 implemented with regard to the server device(s) 1002, different components of the self-optimizing prompt system 100 can be implemented by a variety of devices within the environment. For example, one or more (or all) components of the self-optimizing prompt system 100 can be implemented by a different computing device or a separate server device from the server device(s) 1002 hosting the content management system 1004. For instance, FIG. 10 illustrates that the self-optimizing prompt system 100 can be implemented by the client device 1008.

Each of the components of the self-optimizing prompt system 100 optionally include software, hardware, or both. For example, in some cases, the components include one or more instructions stored on a computer-readable storage medium and executable by processors of one or more computing devices, such as a client device or server device. When executed by the one or more processors, the computer-executable instructions of one or more embodiments of the self-optimizing prompt system 100 cause the computing device(s) to perform the methods described herein. Alternatively, in some instances, the components include hardware, such as a special-purpose processing device to perform a certain function or group of functions. Alternatively, in certain implementations, the components of the self-optimizing prompt system 100 include a combination of computer-executable instructions and hardware.

Furthermore, in one or more embodiments, the components of the self-optimizing prompt system 100 are, for example, implemented as one or more operating systems, as one or more stand-alone applications, as one or more modules of an application, as one or more plug-ins, as one or more library functions or functions that are called by other applications, and/or as a cloud-computing model. Thus, in some embodiments, the components of the self-optimizing prompt system 100 are implemented as a stand-alone application, such as a desktop or mobile application. Furthermore, in some cases, the components of the self-optimizing prompt system 100 are implemented as one or more web-based applications hosted on a remote server device. Alternatively, or additionally, the components of the self-optimizing prompt system 100 are implemented in a suite of mobile device applications or "apps."

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
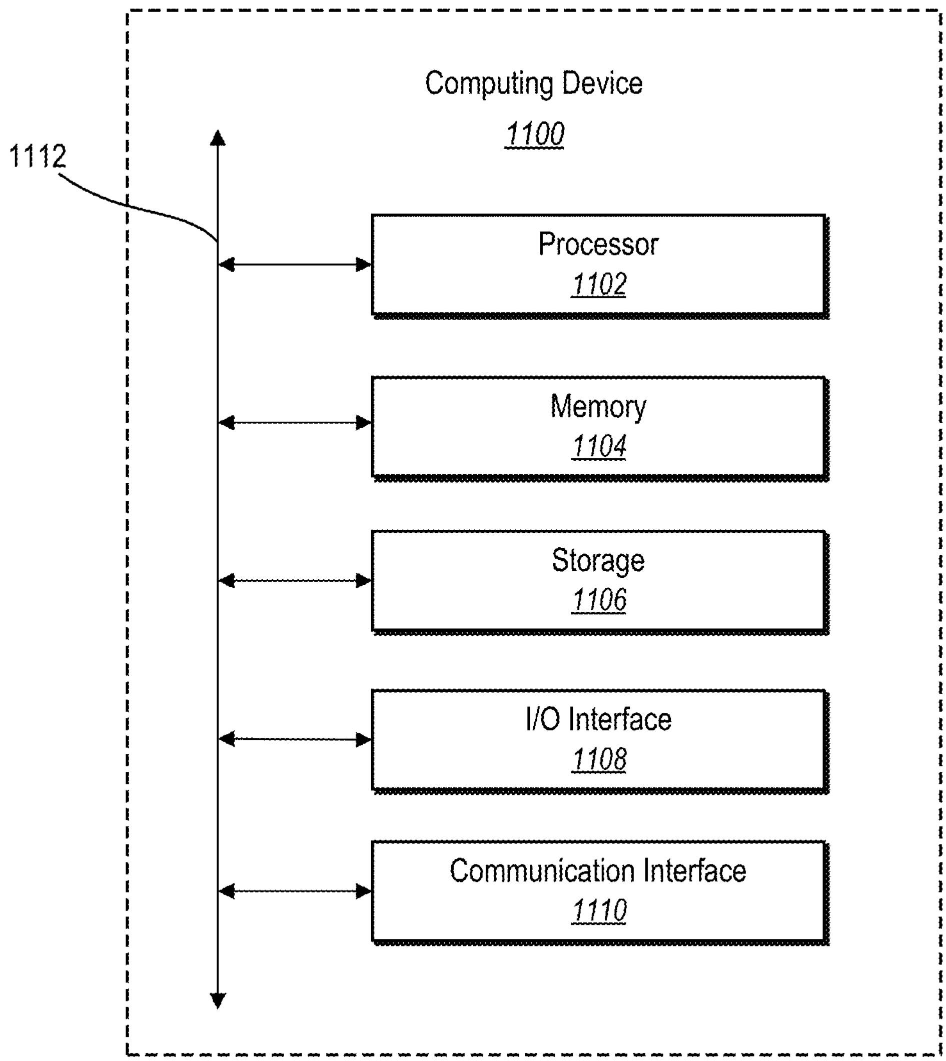
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server device(s) 1002 and/or the client device 1008). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

Figure 12:
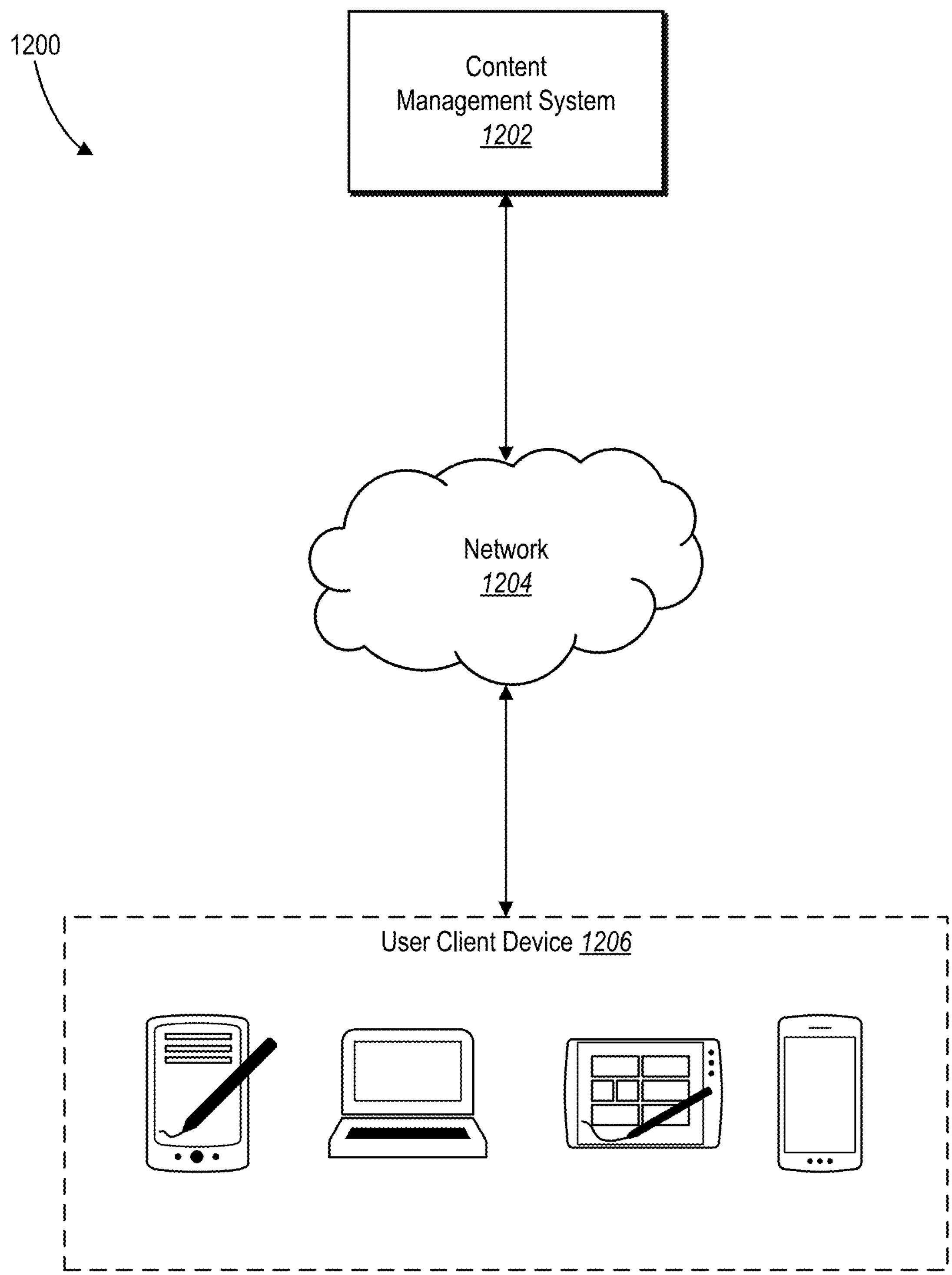
FIG. 12 illustrates a networking environment of a content watermarking system in accordance with one or more embodiments.

FIG. 12 is a schematic diagram illustrating environment 1200 within which one or more implementations of the self-optimizing prompt system 100 can be implemented. As discussed above with respect to FIG. 12, in some embodiments the self-optimizing prompt system 100 can be part of a content management system 1202. In one or more embodiments, the content management system 1202 may generate, store, manage, receive, and send digital content (such as digital videos). For example, content management system 1202 may send and receive digital content to and from the user client device 1206 by way of network 1204. In particular, the content management system 1202 can store and manage a collection of digital content. The content management system 1202 can manage the sharing of digital content between computing devices associated with a plurality of users. For instance, the content management system 1202 can facilitate a user sharing a digital content with another user of content management system 1202.

In particular, the content management system 1202 can manage synchronizing digital content across multiple of the user client device 1206 associated with one or more users. For example, a user may edit digital content using user client device 1206. The content management system 1202 can cause user client device 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the user client device 1206 only stores reduced-sized versions of the digital content. A user can navigate and browse the reduced-sized versions (e.g., a thumbnail of a digital image) of the digital content on user client device 1206. In particular, one way in which a user can experience digital content is to browse the reduced-sized versions of the digital content on user client device 1206.

Another way in which a user can experience digital content is to select a reduced-size version of digital content to request the full- or high-resolution version of digital content from content management system 1202. In particular, upon a user selecting a reduced-sized version of digital content, user client device 1206 sends a request to content management system 1202 requesting the digital content associated with the reduced-sized version of the digital content. Content management system 1202 can respond to the request by sending the digital content to user client device 1206. User client device 1206, upon receiving the digital content, can then present the digital content to the user. In this way, a user can have access to large collections of digital content while minimizing the amount of resources used on user client device 1206.

User client device 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1206 may access content management system 1202.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

sampling a generated task output produced by an agent model operating on a first system prompt and a task input;

comparing, using a meta-prompting model, the generated task output with an expected task output corresponding to the task input;

generating, based on comparing the generated task output with the expected task output, a modified system prompt for the agent model by using the meta-prompting model to modify the first system prompt; and storing the modified system prompt in association with the agent model in a system prompt repository.

2. The method of claim 1, wherein sampling the generated task output comprises:

receiving, within an agentic prompt response architecture, the task input as an input pair comprising a query and a digital document; and calling the agent model to produce the generated task output by generating a relevance score indicating relevance of the digital document to the query.

3. The method of claim 1, wherein comparing the generated task output with the expected task output comprises:

accessing the expected task output from a dataset of annotated task outputs; and determining, by comparing the generated task output with the expected task output, a task output difference between the generated task output and the expected task output.

4. The method of claim 3, wherein determining the task output difference comprises:

determining, by utilizing the meta-prompting model, a quantifiable representation of semantic differences between the generated task output and the expected task output; or determining, by utilizing the meta-prompting model, one or more numerical differences between the generated task output and the expected task output.

5. The method of claim 1, wherein generating the modified system prompt comprises:

detecting a first prompt modification by utilizing the meta-prompting model to compare the generated task output with the expected task output;

detecting a second prompt modification by utilizing the meta-prompting model to compare the generated task output with the expected task output; and generating the modified system prompt by utilizing the meta-prompting model to modify the first system prompt according to the first prompt modification and the second prompt modification.

6. The method of claim 1, further comprising:

generating a modified task output from the modified system prompt;

comparing, using the meta-prompting model, the modified task output for the agent model with the expected task output corresponding to the task input; and generating, based on comparing the modified task output with the expected task output, an additional modified system prompt by utilizing the meta-prompting model to further modify the modified system prompt.

7. The method of claim 1, further comprising:

determining, from the modified system prompt, a relevant agent model within a multi-agent framework corresponding to characteristics of the modified system prompt; and generating a response to the task input by utilizing the relevant agent model according to the modified system prompt.

8. The method of claim 1, wherein storing the modified system prompt comprises:

determining, by comparing the modified system prompt and model metadata of the agent model, that the modified system prompt corresponds to the agent model; and storing, in the system prompt repository, the modified system prompt with a set of prompts for a set of tasks corresponding to the agent model.

9. A system comprising:

at least one processor; and at least one non-transitory computer-readable storage medium storing instructions that, when executed by the at least one processor, cause the system to:

sample a generated task output produced by an agent model operating on a first system prompt and a task input;

compare, using a meta-prompting model, the generated task output with an expected task output corresponding to the task input;

generate, based on comparing the generated task output with the expected task output, a modified system prompt for the agent model by using the meta-prompting model to modify the first system prompt; and store the modified system prompt in association with the agent model in a system prompt repository.

10. The system of claim 9, further comprising instructions that, when executed by the at least one processor, cause the system to sample the generated task output by:

receiving the task input as an input pair comprising a query and a digital document;

accessing the first system prompt in response to determining that the input pair includes characteristics corresponding to the agent model; and producing the generated task output by utilizing the agent model to generate a relevance score indicating relevance of the digital document to the query.

11. The system of claim 9, further comprising instructions that, when executed by the at least one processor, cause the system to compare the generated task output with the expected task output by determining a task output difference between the generated task output and the expected task output.

12. The system of claim 11, further comprising instructions that, when executed by the at least one processor, cause the system to determine the task output difference by:

determining, by utilizing the meta-prompting model, one or more differences between the generated task output and the expected task output; and generating a meta-prompting description of the one or more differences as:

one or more quantifiable representations of semantic differences; or one or more numerical differences.

13. The system of claim 9, further comprising instructions that, when executed by the at least one processor, cause the system to generate the modified system prompt by:

detecting a set of prompt modifications by utilizing the meta-prompting model to compare the generated task output with the expected task output; and generating the modified system prompt by utilizing the meta-prompting model to modify the first system prompt according to the set of prompt modifications.

14. The system of claim 9, further comprising instructions that, when executed by the at least one processor, cause the system to:

generate a modified task output from the modified system prompt;

compare, using the meta-prompting model, the modified task output for the agent model with the expected task output corresponding to the task input;

generate, based on comparing the modified task output with the expected task output, an additional modified system prompt by utilizing the meta-prompting model to further modify the modified system prompt;

determine, from the additional modified system prompt, a relevant agent model within a multi-agent framework corresponding to characteristics of the additional modified system prompt; and generate a response to the task input by utilizing the relevant agent model according to the additional modified system prompt.

15. A non-transitory computer-readable medium storing instructions that, when executed by at least one processor, cause a computer system to:

sample a generated task output produced by an agent model operating on a first system prompt and a task input;

compare, using a meta-prompting model, the generated task output with an expected task output corresponding to the task input;

generate, based on comparing the generated task output with the expected task output, a modified system prompt for the agent model by using the meta-prompting model to modify the first system prompt; and store the modified system prompt in association with the agent model in a system prompt repository.

16. The non-transitory computer-readable medium of claim 15, further comprising instructions that, when executed by the at least one processor, cause the computer system to store the modified system prompt by:

determining, by comparing the modified system prompt and model metadata of the agent model, that the modified system prompt corresponds to the agent model; and storing, in the system prompt repository, the modified system prompt with a set of prompts for a set of tasks corresponding to the agent model.

17. The non-transitory computer-readable medium of claim 15, further comprising instructions that, when executed by the at least one processor, cause the computer system to compare the generated task output with the expected task output by:

accessing the expected task output from a dataset of annotated task outputs; and determining, by comparing the generated task output with the expected task output, a task output difference between the generated task output and the expected task output, the task output difference comprising:

one or more quantifiable representations of semantic differences between the generated task output and the expected task output; or one or more numerical differences between the generated task output and the expected task output.

18. The non-transitory computer-readable medium of claim 15, further comprising instructions that, when executed by the at least one processor, cause the computer system to generate the modified system prompt by:

detecting a first set of prompt modifications by utilizing the meta-prompting model to compare the generated task output with the expected task output;

detecting a second set of prompt modifications by utilizing the meta-prompting model to compare the generated task output with the expected task output; and generating the modified system prompt by utilizing the meta-prompting model to modify the first system prompt to align with the first set of prompt modifications and the second set of prompt modifications.

19. The non-transitory computer-readable medium of claim 15, further comprising instructions that, when executed by the at least one processor, cause the computer system to:

generate, by comparing a modified task output generated from the modified system prompt for the agent model with the expected task output corresponding to the task input, a first additional modified system prompt by utilizing the meta-prompting model to further modify the modified system prompt; and generate, by comparing a first additional modified task output generated from the first additional modified system prompt for the agent model with the expected task output corresponding to the task input, a second additional modified system prompt by utilizing the meta-prompting model to further modify the first additional modified system prompt.

20. The non-transitory computer-readable medium of claim 15, further comprising instructions that, when executed by the at least one processor, cause the computer system to sample the generated task output by selecting the generated task output produced by the agent model generating a relevance score indicating relevance of a digital document to a query within the task input.

* * * * *